US011427716B2

(12) United States Patent
Becker-Willinger et al.

(10) Patent No.: US 11,427,716 B2
(45) Date of Patent: Aug. 30, 2022

(54) HIGHLY STRUCTURED COMPOSITE MATERIAL AND PROCESS FOR THE MANUFACTURE OF PROTECTIVE COATINGS FOR CORRODING SUBSTRATES

(71) Applicant: LEIBNIZ-INSTITUT FUER NEUE MATERIALIEN GEMEINNUETZIGE GMBH, Saarbruecken (DE)

(72) Inventors: Carsten Becker-Willinger, Saarbruecken (DE); Frank Hollmann, Biberach (DE); Marlon Jochum, Marpingen (DE); Michael Opsoelder, Saarbruecken (DE); Sabine Schmitz-Stoewe, Saarbruecken (DE); Douglas Espin, Saarbruecken (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 14/364,699

(22) PCT Filed: Dec. 20, 2012

(86) PCT No.: PCT/EP2012/076353
§ 371 (c)(1),
(2) Date: Jun. 12, 2014

(87) PCT Pub. No.: WO2013/092841
PCT Pub. Date: Jun. 27, 2013

(65) Prior Publication Data
US 2014/0329080 A1     Nov. 6, 2014

(30) Foreign Application Priority Data

Dec. 21, 2011 (WO) ................. PCT/EP2011/073570

(51) Int. Cl.
*C09D 163/00* (2006.01)
*C09D 7/62* (2018.01)
(Continued)

(52) U.S. Cl.
CPC .............. *C09D 7/62* (2018.01); *C09C 1/0021* (2013.01); *C09D 5/084* (2013.01); *C09D 7/70* (2018.01);
(Continued)

(58) Field of Classification Search
None
See application file for complete search history.

(56) References Cited

U.S. PATENT DOCUMENTS 3,227,668 A     1/1966   Ackermann
3,705,109 A    12/1972   Hausler et al.
(Continued)

FOREIGN PATENT DOCUMENTS

CH   WO 2009135784 A1 * 11/2009 ........... C09C 1/0021
CN        101698773 A    4/2010
(Continued)

OTHER PUBLICATIONS

Machine translation JP-04135674-A (Year: 1992).*
(Continued)

*Primary Examiner* — Alexandre F Ferre
(74) *Attorney, Agent, or Firm* — Cahn & Samuels, LLP

(57) ABSTRACT

A highly structured composite material, which can be applied and cured as a protective layer on corroding metal substrates, particularly on steel is provided. Due to its highly structured composition it is a particularly effective barrier to protect metals against attack by corrosive substances such as hydrogen sulfide, carbon dioxide and sea water, if necessary under hydrothermal conditions. At the same time it is also abrasion stable, for example against a grinding effect by (Continued)

| CC / TT | Damage  |
|---------|---------|
| 0 / 0   | 0%      |
| 1 / 1   | < 5%    |
| 2 / 2   | 5 - 15% |
| 3 / 3   | 15 - 35%|
| 4 / 4   | 35 - 65%|
| 5 / 5   | >65%    | sand, as well as resistant to the impact of mechanical load e.g. by tools. This is achieved by a coating composition comprising a binder comprising at least one cross-linkable resin, wherein the resin comprises at least one of polar group; at least one type of hydrophilic flakes with an aspect ratio of more than 10, wherein the surface of the flakes at least partially comprises a metal oxide; and an organic solvent.

17 Claims, 4 Drawing Sheets

(51) Int. Cl.
    *C09D 5/08*     (2006.01)
    *C09C 1/00*     (2006.01)
    *C09D 7/40*     (2018.01)
    *C08K 3/22*     (2006.01)

(52) U.S. Cl.
    CPC ............. *C09D 163/00* (2013.01); *C08K 3/22* (2013.01); *C08K 2201/016* (2013.01); *C09C 2220/106* (2013.01); *Y10T 428/256* (2015.01)

(56) References Cited

U.S. PATENT DOCUMENTS

| | | | |
|---|---|---|---|
| 3,809,442 A | 5/1974 | Peterson et al. | |
| 4,685,598 A * | 8/1987 | Nezworski | B67D 1/0832 |
| | | | 141/113 |
| 4,694,038 A | 9/1987 | Burns et al. | |
| 4,695,598 A * | 9/1987 | Yamamoto | C08G 59/12 |
| | | | 523/400 |
| 4,719,269 A | 1/1988 | Ando et al. | |
| 4,898,905 A | 2/1990 | Kawakami et al. | |
| 4,997,907 A | 3/1991 | Marten et al. | |
| 5,021,471 A | 6/1991 | Treybig | |
| 5,258,441 A | 11/1993 | Nagahiro et al. | |
| 5,312,716 A | 5/1994 | Unoki et al. | |
| 5,330,016 A | 7/1994 | Paske et al. | |
| 5,352,831 A * | 10/1994 | Flury | C07C 279/28 |
| | | | 546/256 |
| 5,354,622 A | 10/1994 | Nakamaru et al. | |
| 5,593,781 A | 1/1997 | Nass et al. | |
| 5,624,887 A | 4/1997 | Nakamaru et al. | |
| 5,749,946 A * | 5/1998 | Glausch | C09C 1/0021 |
| | | | 106/14.17 |
| 5,753,371 A | 5/1998 | Sullivan et al. | |
| 5,789,523 A | 8/1998 | George et al. | |
| 5,910,522 A | 6/1999 | Schmidt et al. | |
| 6,045,914 A | 4/2000 | Sullivan et al. | |
| 6,267,810 B1 | 7/2001 | Pfaff et al. | |
| 6,369,147 B1 | 4/2002 | Polonka | |
| 6,397,895 B1 | 6/2002 | Lively | |
| 7,846,248 B2 * | 12/2010 | Mirone | C09D 175/16 |
| | | | 106/230 |
| 8,372,251 B2 | 2/2013 | Goller et al. | |
| 9,011,622 B2 | 4/2015 | Radtke | |
| 9,051,470 B2 | 6/2015 | de Oliveira et al. | |
| 2002/0054957 A1 | 5/2002 | Johnsen et al. | |
| 2003/0186060 A1 | 10/2003 | Rao et al. | |
| 2004/0229759 A1 | 11/2004 | Joseph et al. | |
| 2005/0065226 A1 | 3/2005 | Mirone et al. | |
| 2005/0228104 A1 | 10/2005 | Feeney et al. | |
| 2006/0048676 A1 | 3/2006 | Bujard | |
| 2006/0159909 A1 | 7/2006 | Aslan et al. | |
| 2007/0068646 A1 | 3/2007 | Freti et al. | |
| 2007/0259182 A1 | 11/2007 | Bujard et al. | |
| 2008/0008838 A1 | 1/2008 | Arpac et al. | |
| 2008/0026233 A1 * | 1/2008 | Kunz | C09D 5/084 |
| | | | 428/457 |
| 2008/0314284 A1 * | 12/2008 | Li | C09C 1/0015 |
| | | | 106/31.9 |
| 2009/0072199 A1 * | 3/2009 | Lewarchik | C08L 63/00 |
| | | | 252/396 |
| 2009/0156736 A1 | 6/2009 | Fischer et al. | |
| 2009/0226742 A1 | 9/2009 | Blum et al. | |
| 2009/0277625 A1 | 11/2009 | Bai et al. | |
| 2009/0324983 A1 | 12/2009 | Hackbarth et al. | |
| 2010/0004353 A1 | 1/2010 | Desai | |
| 2010/0095868 A1 * | 4/2010 | Kaupp | C09C 1/0015 |
| | | | 106/417 |
| 2010/0178308 A1 * | 7/2010 | Iwasa | C09C 1/0015 |
| | | | 424/401 |
| 2011/0008399 A1 | 1/2011 | Bugnon et al. | |
| 2011/0118384 A1 | 3/2011 | Bugnon et al. | |
| 2011/0133132 A1 | 6/2011 | Zhamu et al. | |
| 2011/0284368 A1 | 11/2011 | Goller et al. | |
| 2012/0125229 A1 | 5/2012 | Grüner et al. | |
| 2012/0135209 A1 | 5/2012 | Becker et al. | |
| 2014/0329729 A1 | 11/2014 | Becker-Willinger et al. | |
| 2014/0370217 A1 | 12/2014 | Perez et al. | |

FOREIGN PATENT DOCUMENTS

| | | | |
|---|---|---|---|
| CN | 102109940 A | 9/2011 | |
| DE | 4212633 A1 | 10/1993 | |
| DE | 10326815 A1 | 12/2004 | |
| DE | 102005040735 A1 | 2/2007 | |
| DE | 102006062500 A1 | 7/2008 | |
| DE | 60319674 T2 | 4/2009 | |
| DE | 102009031266 A1 | 1/2011 | |
| DE | 102009035673 A1 | 2/2011 | |
| DE | 102009037323 A1 | 2/2011 | |
| EP | 0387692 A2 | 9/1990 | |
| EP | 5581185 A1 | 2/1994 | |
| EP | 5590488 A1 | 4/1994 | |
| EP | 1350817 A1 | 10/2003 | |
| EP | 1548067 B1 | 8/2006 | |
| EP | 1718690 A1 | 11/2006 | |
| EP | 2180012 A1 | 4/2010 | |
| EP | 2426190 A1 | 3/2012 | |
| EP | 2794769 B1 | 9/2016 | |
| GB | 974874 A * | 11/1964 | ............ B82Y 30/00 |
| GB | 1269522 | 4/1972 | |
| JP | S5411938 A | 1/1979 | |
| JP | S61228059 A | 10/1986 | |
| JP | S62050368 A | 3/1987 | |
| JP | H01-170670 A | 7/1989 | |
| JP | 03205451 A | 9/1991 | |
| JP | 04135674 A * | 5/1992 | |
| JP | 04227778 A | 8/1992 | |
| JP | 07207222 A * | 8/1995 | |
| JP | 2002276665 A | 9/2002 | |
| JP | 2005-330383 A | 12/2005 | |
| JP | 2006328548 A | 7/2006 | |
| JP | 2007-526366 A | 9/2007 | |
| JP | 2011-252112 A | 12/2011 | |
| JP | 2011246707 A | 12/2011 | |
| JP | 2011252122 A | 12/2011 | |
| RU | 2083621 C1 | 7/1997 | |
| WO | 9321127 A1 | 10/1993 | |
| WO | 96/11981 A2 | 4/1996 | |
| WO | 9631572 A1 | 10/1996 | |
| WO | 9746624 A1 | 12/1997 | |
| WO | 200205293 A2 | 1/2002 | |
| WO | 2004022806 A1 | 3/2004 | |
| WO | 2005007763 A1 | 1/2005 | |
| WO | 2005010107 A1 | 2/2005 | |
| WO | 2005044551 A1 | 5/2005 | |
| WO | 2005080465 A1 | 9/2005 | |
| WO | 2006007385 A1 | 1/2006 | |
| WO | 2006021528 A1 | 3/2006 | |
| WO | 2006066825 A1 | 6/2006 | |
| WO | 2006068493 A1 | 6/2006 | |
| WO | 2006079643 A1 | 8/2006 | |
| WO | 2008054413 A2 | 5/2008 | |
| WO | 2008090411 A2 | 7/2008 | |
| WO | 2009111049 A1 | 9/2009 | |
| WO | 2009135784 A1 | 11/2009 | |

(56) References Cited

FOREIGN PATENT DOCUMENTS

| WO | 2011/014288 A2 | 2/2011 |
|---|---|---|
| WO | 2011/051122 A1 | 5/2011 |
| WO | 2013092835 A1 | 6/2013 |

OTHER PUBLICATIONS

Derwent Abstract JP-07207222-A (Year: 1995).*
English abstract of DE102006062500 (A1)—Jul. 3, 2008.
English abstract of DE102009037323 (A1)—Feb. 17, 2011.
English abstract of DE102009031266 (A1)—Jan. 13, 2011.
English abstract of DE60319674 (T2)—Apr. 23, 2009.
English abstract of DE4212633 (A1)—Oct. 21, 1993.
English abstract of EP1718690 (A1)—Nov. 8, 2006.
English abstract of EP0387692 (A2)—Sep. 19, 1990.
English abstract of JP 5411938 (A)—Jan. 29, 1979.
English abstract of WO2004022806 (A1)—Mar. 18, 2004.
English abstract of WO2006079643 (A1)—Aug. 3, 2006.
English abstract of WO2005080465 (A1)—Sep. 1, 2005.
English abstract of WO2005044551 (A1)—May 19, 2005.
English abstract of WO2006007385 (A1)—Jan. 19, 2006.
English abstract of WO9321127(A1)—Oct. 28, 1993.
English abstract of WO9631572 (A1)—Oct. 10, 1996.
English abstract of JP62050368 (A)—Mar. 5, 1987.
Maile, Frank J., et al., "Effect Pigments—Past, Present and Future", Progress in Organic Coatings, 2005, pp. 150-163, vol. 54.
Buxbaum, Gunter, et al., "Industrial Inorganic Pigments", 2005, 3rd ed., Wiley-VCH, pp. 243-248.
International Preliminary Report on Patentability, dated Jun. 2014.
English Abstract of JP 2011252122 (A)—Dec. 15, 2011.
English Abstract of WO 0205293 (A2)—Jan. 17, 2002.
English Abstract of JP 2011-252112 (A)—Dec. 15, 2011.
English Abstract of JP 2005-330383, dated Dec. 2, 2005.
English Abstract of JP H01-170670, dated Jul. 5, 1989.
English Abstract of JP 2007-526366, dated Sep. 13, 2007.
English Abstract of JP 2006328548.
English Abstract of JP 2002276665.
English Abstract of JP 04227778.
English Abstract of JP 03205451.
Machine translation of JP 2002276665A, dated Apr. 20, 2018.
English Abstract of JP 2002276665A, Sep. 25, 2002.
Technical Data Sheet, 58104 colorstream F20-00 WNT Autumn Mystery, MERCK, 1 page (2003).
Colorstream F20-00 WNT Autumn Mystery Product Information, MERCK, 6 pages.
Huber, J., Zur Natur von γ-Fe2O3, Dissertation, pp. 46 and 51 (2004).
Machine translation of Huber, J., Zur Natur von γ-Fe2O3, Dissertation, pp. 46 and 51 (2004).
Colorstream T20-04 WNT Lapis Sunlight Product Information, MERCK, 6 pages (2007).
Zhang et al., "Effect of Particle Surface Treatment on The Tribological Performance of Epoxy Based Nanocomposites", Wear 253 (2002) 1086-1093.
English abstract of EP 2 794 769 B1.
Colorstream F20-00 WNT Autumn Mystery Product Information, MERCK, 6 pages, circa 2007.
Special Chem, UBE Improve the durability of PU Coatings, Fluorolink® D10 H and Fluorlink® E10 H PFPE: Innovative Additives from Solvay Solexis for Improving the Performance of Polymeric Materials, Aug. 28, 2009, 1 page.
Solvay Solexis, Fluorolink Polymer Modifiers, Product Data Sheets, Dec. 13, 2002, 5 pages.
Sørensen, et al., "Anticorrosive coatings: a review", J. Coat. Technol. Res., 6(2), 135-176, 2009.
English abstract of DE 102005040735(A1)—Feb. 22, 2007.
English abstract of WO 2005007763(A1)—Jan. 27, 2005.
English abstract of CN 102109940(A)—Sep. 21, 2011.
English abstract of CN 101698773(A)—Apr. 28, 2010.
English abstract of JP2011246707 (A)—Dec. 8, 2011.
English abstract of JPS61228059 (A)—Oct. 11, 1986.

* cited by examiner

| CC / TT | Damage |
|---------|--------|
| 0 / 0   | 0%     |
| 1 / 1   | < 5%   |
| 2 / 2   | 5 - 15% |
| 3 / 3   | 15 - 35% |
| 4 / 4   | 35 - 65% |
| 5 / 5   | >65%   |

HIGHLY STRUCTURED COMPOSITE MATERIAL AND PROCESS FOR THE MANUFACTURE OF PROTECTIVE COATINGS FOR CORRODING SUBSTRATES

This patent application is a U.S. national stage application of PCT international application PCT/EP2012/076353 filed on 20 Dec. 2012 and claims priority of PCT/EP2011/073570 filed on 21 Dec. 2011, the entirety of which is incorporated herein by reference.

FIELD OF THE INVENTION

The invention relates to a highly structured composite material, which can be applied and cured to form a protective layer on corroding metal substrates, particularly on steel. Due to its highly structured composition it is a particularly effective barrier to protect metals against attack by corrosive substances such as hydrogen sulfide, carbon dioxide and sea water, if necessary under hydrothermal conditions. At the same time it is also abrasion stable, for example against a grinding effect by sand, as well as resistant to the impact of mechanical load e.g. by tools.

INTRODUCTION

Structures from corroding materials generally require a suitable corrosion protection to ensure the stability of the overall design structure over a long period of time. In particular, surface coatings with a good adhesion to the surface and a strong barrier effect are used in these applications. For the purpose of a durable and more versatile use, suitable corrosion protection coatings advantageously should be abrasion and hydrolysis stable and have good mechanical stability. Especially in the oil and gas industries steel is widely used as material for casing and feed pipes, which are placed deep into the rock of the borehole. Steel is used because of its good temperature resistance and excellent mechanical properties with respect to stiffness and abrasion resistance. In a number of wells not only sand containing oil, temperature and pressure are factors that act on the steel, but there is also a considerable amount of corrosive substances. These include, in addition to formation and injection water with high salt content, which generally leads to corrosion (red rust), especially hydrogen sulfide and carbon dioxide, which act on the steel under hydro-thermal conditions in the hole and cause sustainable damage. Continued exposure to hydrogen sulfide leads to embrittlement (sulfide stress cracking) and/or sour corrosion of the steel. Carbon dioxide causes surface corrosion with the formation of iron carbonate, which can be easily rubbed off by the entrained sand in the oil-sea water mixture (sweet corrosion). These mechanisms lead to brittle failure or loss of solid mass of steel respectively. The low-lying delivery pipes become unusable within a short time and must be replaced. The replacement causes a complete halt of production and leads to heavy financial losses. In practice, one encounters this problem by using high-chromium-containing steels, which are very expensive. The use of such materials is actually economically viable only in specific cases. Carbon-steels with a suitable protective layer in this context could lead to a significant cost reduction. It is essential that the coating in addition to corrosion protection, meets all other requirements for abrasion resistance, temperature resistance and impact resistance.

DESCRIPTION OF RELATED ART

In order to protect corroding metals for example such as steel against the effects of hydrogen sulfide, carbon dioxide and sea water under hydrothermal conditions, the application of a surface coating with a very good diffusion barrier to small gas molecules is required. For the hydrogen sulfide the damaging effect starts already at low concentrations. It may be advisable to also provide additionally an absorber in order to achieve maximum long-term effect. Inorganic materials such as ceramics or glasses are structurally impermeable to gases.

Coppe/UFRJ (WO 2004/022806 A1) claims layers of niobium oxide applied via thermal spraying to protect steel against $H_2S$-attack. Due to their purely inorganic ceramic nature these layers are brittle and may be prone to cracking if the coated steel components are bended, losing the good intrinsic barrier effect again.

To circumvent the problem of brittleness and to open up the possibility to coat three dimensional internal surfaces homogeneously, polymer-based coatings were used. Amorphous and semi-crystalline polymers are due to their structure not completely gastight, but can be applied by wet chemical processes on surfaces such as by painting. The matrices used are usually selected from the class of thermosetting materials because they adhere well to metals and are among the more gastight polymers. By the formation of composite materials with inorganic fillers one tries to improve the barrier effect on the one hand and other to provide additional absorber properties.

Nippon Steel Corp. (JP S54-011938 A) describes a protective layer against $H_2S$ based on epoxy-polyurea resin and lead powder. The hydrogen sulfide is absorbed by reaction with the lead during diffusion to the metal surface. The disadvantage here is the use of polluting heavy metals for corrosion protection. Further, the lead powder is coarse microscale and interferes at high concentrations with the network structure of epoxy resin matrix, resulting in loss of barrier effect.

BASF Company (WO 2006/079643 A1) claims protective layers with intrinsic inhibitory function in the context of $H_2S$ based on polymer matrices with nitrile and thioamide functions. Similar concepts have been pursued by Universal Oil Products (U.S. Pat. No. 3,705,109) using carboxyl group-containing matrices or Rossijskij KHIM (RU 2083621) using ketimines and 2,4,6-tris(dimethyl-aminopropyl)phenol as a scavenger. The disadvantage here is the lack of abrasion resistance.

Schlumberger Canada Ltd. (US 2009/0277625 A1) claims compositions of a thermoplastic resin, a thermosetting resin and at least one component that can interact with $H_2S$. This component is an amine group-containing polymer which is applied on the surface of silica particles. Also, this composition does not show increased abrasion resistance.

Beside an active absorber function to hydrogen sulfide the effect of corrosive gas molecules on the metal surface can be reduced by delaying the diffusion of these gas molecules by a tile-like arrangement of flake-shaped particles. This elongates the diffusion path of the gas molecules and is called the geometric approach according to the Nielsen model.

In such layers the content of filler as well as the aspect ratio, the ratio between length and thickness, of the platelet-shaped particles is of crucial importance for the barrier effect. The thinner and longer the plates are, the higher the barrier effect. To achieve a significant effect, the aspect ratio should be at least greater than 10. The aspect ratio of such a particle is defined as the ratio of the average length measurement value, which corresponds to the average diameter here, to the average thickness measurement value. Such values can be measured by TEM.

Nippon Paint Co. Ltd. (JP S62-050368 A) uses a composite based on epoxy-phenolic resins in combination with platelets of metallic nickel. These approaches use first, the barrier effect of the crosslinked resin matrix and second the active function of $H_2S$ immobilization of metallic nickel.

Similar systems are claimed by Henkel (DE 10 2006 062 500 A1) for coating metal surfaces. However, these systems are based on the use of aluminum flakes and are not intended for use against $H_2S$. The aluminum flakes are used instead of generating an electrical conductivity and weldability of the coatings. They are oriented randomly in the resin matrix. The application refers to the coil coating process and the replacement of a zinc coating. An influence on the barrier effect is not described.

Nanosolar Inc. (WO 2005/044551 A1) claims an inorganic-organic hybrid nano-laminate barrier layer. The nanoscale phases contained in the coating are formed in situ by the sol-gel process from molecular precursors. The result is a quasi-interpenetrating network system. A special effect on $H_2S$ is not described.

Eckart GmbH claims an inkjet ink containing aluminum and pearlescent effect pigments in polymer matrix (DE 10 2009 037 323 A1) and an inkjet ink containing pearlescent pigments based on fine and thin substrates in a radiation cured matrix (DE 102 009 031 266 A1), each using a polymeric waxy anti-settling agent for platelet. This is necessary because the ink-jet printing ink is heavily diluted with solvent and the polymer binder is used in significant lower than stoichiometric amounts compared to the effect pigments. Such compositions have no relevance for anti-corrosion applications.

Plastlac (DE 603 19 674 T2) takes a similar approach to generate a UV-curable acrylic paint containing lamellar pearlescent pigments in particular for coating plastics. Here, too, polymer-based wax dispersions for orienting the platelet fillers are claimed to enhance the desired optical effects.

All the latter three approaches describe a visual and decorative effect and its improvement through alignment of the platelets. None of the above three describes an application in the field of corrosion protection.

Siemens Power Generation (WO 2006/007385 A1) claims composites of highly structured resin systems with fillers of high thermal conductivity, wherein the highly structured resin systems include liquid crystal polymers, interpenetrating networks, dendrimers, star polymers, ladder polymers, expanding polymers or structured organic-inorganic hybrids. The high structure of the resulting composite and the high orientation of the fillers with high thermal conductivity and high aspect ratio are determined by the mesostructure of the polymer matrix and lead to composites with high thermal conductivity. By the mesostructure of the matrix a close sequence between the polymer structures and the thermally conductive particles is achieved, which leads to good contact between the two phases and thus leads to thermal conductivity at an optimal level. A barrier effect against diffusion of small molecules and corrosion protection are not described.

EP 1 718 690 A1 describes low-energy abrasion resistant coatings with increased alkali resistance. The material composition comprises a curable organic binder system; at least one functionalized fluorine-containing polymer or oligomer which is reactive with the binder, and inorganic particles. From the matrix no cross-linking to the particles used is formed. The inorganic particles are mixed with the polymer matrix only physically. There is no phase connection, so that the particles are not included as additional network points in the resulting composite, which weakens the material in particularly with respect to their barrier properties against water vapour and gas molecules. In addition, the functionalized fluorine component cannot be effectively integrated into the matrix if binder systems with low reactivity are used. The consequence is the occurrence of micro-phase separation of fluorine component, resulting in poor adhesion to the substrate and extender function with respect to the matrix. A corrosion-protective effect and a diffusion barrier effect are not described in the application.

The object of the present invention to provide a coating composition, which can be applied to corroding metal substrates (substrates which are prone to corrosion) and shows cured excellent adhesion to the substrate with excellent abrasion and wear as well as impact resistance combined with a high barrier function against the diffusion of water vapour and corroding gases, and media and optionally a repellent effect against hydrophilic and oleophilic substances.

SUMMARY OF INVENTION

The invention solves the task by a coating composition for obtaining a highly structured composite material as protective coating, which protects corroding metal substrates by excellent adhesion to the substrate and effective barrier against a particularly corrosive attack by hydrogen sulfide, carbon dioxide and formation and injection water with high salt content under hydrothermal conditions (elevated pressure and temperature). The coating composition can be applied by spraying directly onto the substrate, preferably a metal surface, and is then cured. It then forms a coating, which is also abrasion and impact resistant.

This aim is achieved by the inventions as claimed in the independent claims. Advantageous embodiments are described in the dependent claims.

Even if no multiple back-referenced claims are drawn, all reasonable combinations of the features in the claims shall be disclosed.

The problem is solved by a coating composition comprising:
a) a binder comprising at least one cross-linkable resin, wherein the resin comprises at least one of polar group;
b) at least one type of hydrophilic flakes with an aspect ratio of more than 10, wherein the surface of flakes at least partially comprises a metal oxide; and
c) an organic solvent.

The main feature of the composition of the invention is to provide a highly structured composite structure, which proposed to be responsible for the excellent barrier properties and good adhesion to the corroding metal substrate combined with abrasion and hydrolysis resistance.

When mixing the binder with an organic solvent and the (hydrophilic by the metal oxide coating) flakes the precursors of the cross-linkable resin comprising at least one polar group are absorbed on the metal oxide surface of the flakes. For reasons of thermodynamic compatibility results in a uniform distribution of the flakes in the coating composition, which is frozen in the drying and curing process after the application by cross-linking of the binder in their distribution state. The distribution function of the flakes within the coating is better, the smoother and more even the flake type carrier substrates for the metal oxides are, because such entanglement between the particles during application and drying process is minimized.

DETAILED DESCRIPTION OF THE INVENTION

The binder comprises at least one cross-linkable resin, wherein the resin comprises at least one polar group. A resin can be a monomer, oligomer or polymer comprising the necessary functional groups to be curable.

A polar group can be any group comprising a dipole moment. Preferably polar groups, that can form complexes with the metal oxide surface, preferably transition metal oxide surfaces.

Examples for these groups are groups containing hetero atoms for example an atom of an element in group 15 or 16 in 2 to 4 periods of the periodic table, typically, nitrogen, oxygen, sulfur, phosphorus atoms, and the like.

A polar group having such hetero atom may for example be hydroxyl, alkoxysilyl, epoxy, carboxyl, ester, carbonyl, oxycarbonyl, sulfide, disulfide, sulfonyl, sulfinyl, thiol, thiocarbonyl, imino, amino, nitrile, ammonium, imide, amide, hydrazo, azo, diazo, cyanide, guanidine, oxygen-containing heterocyclic, nitrogen-containing heterocyclic, sulfur-containing heterocyclic groups and the like.

Among those polar groups, hydroxyl, alkoxysilyl, epoxy, carboxyl, sulfide, sulfonyl, thiol, amino, cyanide, nitrogen-containing heterocyclic groups and the like are preferred.

Those more preferred are hydroxyl, alkoxysilyl, epoxy, carboxyl, amino, nitrogen-containing heterocyclic groups, and the like, with those preferred particularly being hydroxyl and amino groups.

The polar group may be the functional group of the resin, through which the cross-linking of the resin is possible. It may also be an additional or separate group.

Possible resins are polyepoxides. The polyepoxides may be either saturated or unsaturated, and may be aliphatic, cycloaliphatic, aromatic or heterocyclic. They may also contain substituents which do not cause any interfering side-reactions under the reaction conditions, for example alkyl or aryl substituents, ether groups and the like.

These epoxide compounds are preferably polyglycidyl ethers based on polyhydric, preferably dihydric, alcohols, phenols, hydrogenation products of these phenols and/or novolaks (reaction products of mono- or polyhydric phenols with aldehydes, in particular formaldehyde, in the presence of acidic catalysts). The epoxide equivalent weights of these epoxide compounds (epoxy resins) are between 100 and 5000, preferably between 160 and 4000. Examples of polyhydric phenols are: resorcinol, hydroquinone, 2,2-bis(4-hydroxyphenyl)propane (bisphenol A), isomer mixtures of dihydroxydiphenylmethane (bisphenol-F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4hydroxyphenyl)isobutane, 2,2-bis(4-hydroxy-tertbutylphenyl)propane, bis(2-hydroxynaphthyl)methane, 1,5-dihydroxynaphthalene, tris(4-hydroxyphenyl)methane, bis(4-hydroxyphenyl)ether, bis(4-hydroxyphenyl)sulfone etc. and the products of chlorination and bromination of the abovementioned compounds. Bisphenol A and bisphenol F are particularly preferred in this respect.

Also suitable are the polyglycidyl ethers of polyhydric alcohols. Examples of such polyhydric alcohols are ethylene glycol, diethylene glycol, triethylene glycol, 1,2-propylene glycol, polyoxypropylene glycols (n=1-10), 1,3-propylene glycol, 1,4-butylene glycol, 1,5-pentanediol, 1,6-hexanediol, 1,2,6-hexanetriol, glycerol and 2,2-bis(4-hydroxycyclohexyl)propane.

Polyglycidyl esters of polycarboxylic acids can also be used, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-napthalenedicarboxylic acid and dimerized linolenic acid. Examples are diglycidyl adipate, diglycidyl phthalate and diglycidyl hexahydrophthalate.

These polyepoxide compounds can also be used in mixtures with one another and, if appropriate, in mixtures with monoepoxides. Examples of suitable monoepoxides are: epoxidized monounsaturated hydrocarbons (butylene oxide, cyclohexene oxide, styrene oxide), epoxide ethers of monohydric phenols (phenol, cresol and other o- or p-substituted phenols), and glycidyl esters of saturated and unsaturated carboxylic acids.

Further suitable epoxides for the reaction are those containing amide or urethane groups, for example triglycidyl isocyanurate or glycidyl-blocked hexamethylene diisocyanate.

Further suitable epoxide compounds are derived from unsaturated fatty acids, for example from linoleic acids or linolenic acids. Examples of suitable epoxidized fatty acid derivatives are those from linseed oil, soya bean oil, alkyl esters of ricinene fatty acid, soya bean oil or linoleic fatty acid, oleic or arachidonic acid, and oligomeric fatty acids and their esters, and epoxidized alkyl esters having two or more ester groups are also suitable. Epoxidized linseed oil and soya bean oil are preferred.

Mixtures of the epoxides stated can likewise be employed. A precondition for all epoxides which can be employed within the scope of the present invention, where they have not been completely or partly reacted with monocarboxylic acids, is that they contain polar groups.

Provided they contain a sufficient number of polar groups, the polyepoxide compounds can be employed as such; however, it is often advantageous to react some of the reactive epoxide groups with a modifying material in order to achieve free polar hydroxyl groups.

Plasticized epoxy resins with terminal epoxy groups are particularly preferred, which are prepared by partial reaction of the epoxy groups of epoxy resins containing at least two epoxy groups with OH— and COOH-containing substances, such as polyhydric alcohols, for example the abovementioned diols or phenols, polycarboxylic acids or polyesters containing carboxyl or OH groups, or by reaction with polyamines.

Possible epoxies containing hydroxyl groups are also reaction products of compounds having at least two 1,2-epoxide groups per molecule and epoxide equivalent weights of from 160 to 600, and aromatic dicarboxylic acids or mixtures thereof with compounds from the group comprising (cyclo)aliphatic dicarboxylic acids, monocarboxylic acids and/or monohydric phenols, and optionally cyclic anhydrides. Products of this type are described in EP 0 387 692 A2, to which reference is made here. For the preparation of these reaction products it is possible to use all the epoxy compounds mentioned in the introduction.

The coating composition may also comprise a phenolic resin. Suitable phenolic resins are for example reaction products of monohydric or polyhydric phenols with an aldehyde. Typical examples are resins prepared from phenol, resorcinol, o-, m- or p-cresol, xylenol, para-tertiarybutyl phenol, nitrophenol or 2,2-bis(4-hydroxyphenol) propane condensed with formaldehyde, acetaldehyde or propionaldehyde.

Preferred phenolic resins are polyalkylol phenols wherein the phenolic functionality has been at least partially etherified with e.g. methyl, ethyl or butyl groups.

The binder may also comprise a phenoxy resin. Phenoxy resins, sometimes referred to herein as "thermoplastic polyhydroxyethers," are known in the art as components of corrosionresistant coatings. "Phenoxy resins" is the generic term used to describe the amorphous, high-molecular-weight poly(hydroxy ethers) derived from diphenols and epichlorohydrin. Phenoxy resins useful in this invention are the high molecular weight reaction products of Bisphenol A and epichlorohydrin. Such poly(hydroxy ether) reaction products have molecular weights which range from about 6000 to about 85000.

Phenoxy resin provides a high molecular weight thermoplastic copolymer having good adhesive properties, dimensional stability, and good resistance to many acids, alkalies, and aliphatic hydrocarbons. Phenoxy resins are usually derived from the same materials as epoxy resins, but phenoxy resins do not have epoxy groups on their molecular chains. Phenoxy resins do have hydroxyl groups on their molecular chains; these hydroxyl groups enable cross-linking (curing) with isocyanates, anhydrides, triazines, and melamines. Phenoxies are copolymers that are usually derived from bisphenol A and epichlorohydrin and have the repeating structural formula $$—[OC_6H_4C(CH_3)_2C_6H_4OCH_2CH(OH)CH_2]_n—. \quad (I)$$

In preferred embodiments of the phenoxy resin, "n" in the above structural formula (Formula I) is from about 35 to about 120. The phenoxy accordingly has a molecular weight of from about 10000 to about 35000.

Preferred resins are resin of the epichlorohydrin-bisphenol A type, for example available under the trademark Beckopox from Cytec). Preferred resins show an epoxide equivalent weight between 1500 and 2500.

The aminoplast resins useful in this invention are the well known reaction products of urea and triazine compounds with aldehydes further etherified with alcohols. Such resins include those derived from urea, thiourea, ethylene urea, melamine, benzoguanamine and acetoguanamine. The aldehydes used in the reaction with the urea and triazine are 1 to 8 carbon aldehydes, e.g., formaldehyde and the formaldehyde forming compounds, trioxane and paraformaldehyde, acetaldehyde, propionaldehyde and butyraldehyde. Alcohols which are used to alkylate or etherify the urea and triazine-aldehyde reaction products are 1 to 8 carbon monohydric alcohol, e.g., methyl alcohol, isopropyl alcohol, butyl alcohol and 2-ethylhexyl alcohol. Examples for aminoplast resins for use in this invention are butylated urea-formaldehyde resins, methylated and butylated melamine-formaldehyde and benzoguanamine-formaldehyde resins.

The binder may also comprise polyurethane resin comprising polyisocyanates. The polyisocyanate may have two or more isocyanate groups. It may, for example, be aliphatic, alicyclic, aromatic or heterocyclic, monocyclic or polycyclic. It is possible to use customary polyisocyanates, for example monomeric polyisocyanates, polyisocyanate adducts, so-called modified polyisocyanates or mixtures thereof. These are known to those skilled in the art and are commercially available. The adducts may, for example, have a mean NCO functionality of from 2 to 6, preferably from 2.4 to 4. The polyisocyanate adducts are, for example, those which find use typically as hardeners for two-component urethane coating systems. Examples of suitable polyisocyanates are the diisocyanates known from polyurethane chemistry, for example 1,3-diisocyanatobenzene, 2,4- and 2,6-tolylene diisocyanate (TDI), 1,6-hexamethylene diisocyanate (HMDI), 4,4'- and 2,4'diphenylmethane diisocyanate (MDI), naphthylene diisocyanate, xylylene diisocyanate, isophorone dissocyanate, paraphenyl diisocyanates, dicyclohexylmethane diisocyanate, cyclohexyl diisocyanate, polymethylpolyphenyl isocyanate, 1,6-dodecamethylene diisocyanate, 1,4-bis(isocyanatocyclohexyl)methane, pentamethylene diisocyanate, trimethylene diisocyanate, triphenylmethane diisocyanate, and the higher molecular weight polyisocyanates derived from these diisocyanates, for example based on isocyanurate, uretdione, allophanate and biuret. The isocyanates are obtainable, for example, under the trade names Desmodur® and Baymidur® (from Bayer) CARADATE® (from Shell), TEDIMON® (from Enichem) and LUPRANAT® (from BASF). Examples of monomeric polyisocyanates having more than two isocyanate groups are, for example, 4-isocyanatomethyl-1,8-octane diisocyanate and aromatic polyisocyanates such as 4,4',4"-triphenylmethane triisocyanate or polyphenolpolymethylene polyisocyanates.

The polyisocyanate can be used in blocked form in order to prevent an uncontrolled, rapid reaction from setting in, and become active only after deblocking, for example by heating. The blocking of isocyanates is a process known to those skilled in the art for reversibly lowering the reactivity of isocyanates. To block the isocyanates, all common blocking agents are useful, for example acetone oxime, cyclohexanone oxime, methyl ethyl ketoxime, acetophenone oxime, benzophenone oxime, 3,5-dimethylpyrazole, 1,2,4-triazole, ethyl malonate, ethyl acetate, ε-caprolactam, phenol or ethanol.

The polyol component used may be pure di-, tri- or polyalcohols, for example ethylene glycol, trimethylolpropane, or partially hydrolyzed fatty acid glycerides. However, these are commonly used only as the starting basis for higher molecular weight polyhydroxyl compounds. These may be, for example, more or less highly branched polyester polyols (Desmophen® types) formed with dicarboxylic acids or polyether polyols formed by addition of epoxides (Desmophen U® types). Other examples are hydroxy-functional acrylic resins (Desmophen A® types).

Polyurethane resin coating materials can be formed from the polyisocyanates and the polyols. Of course, in particular in the case of unblocked polyisocyanates, it may be necessary to mix the components with one another only shortly before use. Polyisocyanates may also be reacted with compounds having other functional groups which contain active hydrogen. Examples of these groups are thiol groups (—SH), primary or secondary amino groups (—NHR' where R' may, for example, be H, alkyl, cycloalkyl, aryl and corresponding aralkyl and alkaryl groups) or carboxyl groups (—COOH). The reaction products formed in the reaction with isocyanates are urethanes (in the case of hydroxyl and carboxyl), thiourethanes (in the case of thiol) or ureas (in the case of amine).

The binder may also comprise acrylic resins, which comprise at least one polar group. Such resins can either comprise monomers comprising at least one polar group or may comprise copolymers of (meth)acrylic monomers with one or more ethylenic monomers comprising at least one polar group. Examples for (meth)acrylic monomers hydroxymethyl(meth)acrylat, hydroxyethyl(meth)acrylate (HEA, HEMA), Hydroxypropyl(meth)acrylate (HPA, HPMA), hydroxybutyl(meth)acrylat (HBA, HBMA), 2(2-Ethoxy-ethoxy)ethyl(meth)acrylat, 2-Phenoxyethyl(meth)acrylate, Caprolacton(meth)-acrylate (HO—(CH$_2$)$_5$COO—(CH$_2$)$_5$COOCH$_2$CH$_2$CH=CH$_2$), methoxypolyethylenglycolmono(meth)acrylate, polypropylenglycolmono(meth)acrylat, polyethylenglycolmono(meth) acrylat, tetrahydrofurfuryl(meth)acrylate, furfuryl(meth)-acrylat, 1,3-butylenglycoldi(meth)acrylate, 1,4-butandioldi (meth)acrylate, diethylenglycoldi(meth)acrylate, dipropylenglycoldi(meth)acrylate, ethoxylated Bisphenol-A-di(meth)acrylate, trimethylolpropantri(meth)acrylat, ethylenglycolmonoacetoacetatmono(meth)acrylate, dimethylamino-(2-)-ethyl(meth)acrylate, tetraethylenglycol(meth)acrylate.

As ethylenic monomers allylic alcohol or propoxylated allylic alcohol can be used.

In a preferred embodiment a mixture of epoxide resins and phenolic resins and/or phenoxy resins is used.

For a typical coating composition 40 to 98 wt.-% of binder is used, preferably 40 to 95 wt.-%, more preferably 50 to 95 wt.-%.

All wt.-% of the coating composition in this specification are calculated with respect of all components of the coating composition except the organic solvent.

If a mixture of epoxy resins and phenolic resins and/or phenoxy resins (the phenolic and phenoxy resins added) is used, the preferred ratio is between 10:1 to 1:1, preferably 8:1 to 2:1 (in wt.-%).

The coating composition further comprises at least one type of hydrophilic flakes with an aspect ratio of more than 10.

The average aspect ratio of the flakes, i.e. the ratio of the average length measurement value, which corresponds to the average diameter for such flakes, to the average thickness measurement value, is usually 10 to 200, preferably 10 to 150 and particularly preferably 10 to 100. The aspect ratio can be measured with TEM.

The surface of the flakes at least partially comprises a metal oxide, which makes the flakes hydrophilic. Therefore either the particle itself may consist of the metal oxide (e.g. $TiO_2$ flakes) or a carrier substrate is at least partially covered by at least one metal oxide layer. Such layered coatings may comprise more than one layer of different compositions. For the invention only the surface layer is important.

The metal oxide on the surface is a metal oxide, which is capable of complex formation, mainly an oxide on which organic compounds with polar groups can be absorbed. In a preferred embodiment of the invention the metal oxide is a transition metal oxide, more preferably $TiO_2$, $Fe_2O_3$ or $ZrO_2$ or mixtures thereof.

The metal oxide surface of the flakes is very important. Using glass flakes with the same size distribution, but without a metal oxide coating, no highly structured composite coating is formed. The resulting coating does not show the desired barrier properties and corrosion protection. Therefore the interface between the metal oxide and the binder is very important.

In another embodiment of the invention the metal oxide on the surface, which is capable of complex formation, is $TiO_2$, $Fe_2O_3$, $V_2O_5$, $CeO_2$, $MnO_2$, $CuO$ or $ZrO_2$ or mixtures thereof.

Some transition metal oxides can provide additional functionality to the flakes.

With $V_2O_5$ further anti-fouling properties may be obtained. It catalyses oxidation processes, which also leads to an antibacterial effect.

$CeO_2$ is a co-catalyst for oxidation catalysts comprising Ti or V. It may be necessary to provide further components comprising these transition metals.

$MnO_2$ is a catalyst itself or a co-catalyst for oxidation catalysts comprising Ti or V. It may be necessary to provide further components comprising these transition metals.

CuO provides an antibacterial and anti-fouling effect by a slow release of $Cu^{2+}$ ions.

$Fe_2O_3$, $V_2O_5$, $CeO_2$, $MnO_2$ or CuO may also be present in minor amounts, e.g. as dopant, to achieve the effects together with $TiO_2$, $Fe_2O_3$ or $ZrO_2$ or mixtures thereof.

All these effects may also be obtained by adding particles comprising these transition metal oxides as described later.

In a preferred embodiment of the invention the coated flakes are generated by use of carrier substrates, which are available by a web coating process. The carrier flakes produced are then crushed and then fractionated. Then these flakes are coated with the metal oxide with controlled thickness by wet chemical precipitation (G. Buxbaum and G. Pfaff Industrial inorganic pigments, $3^{rd}$ ed. Wiley-VCH pages 243-248; F. J. Maile et al. Progress in Organic Coating 2005, 54, 150-163).

After filtration and drying the coated flakes are then calcinated. This leads to metal oxide layers with a closed grain structure, which is well suited for a good interface between binder and flakes.

The metal oxide layer has typically a thickness between 10 nm and 1000 nm.

In a preferred embodiment at least one of the large surfaces of the flakes are coated with the metal oxide coating, preferably both large surfaces, more preferably the whole surface of the particles is coated with the metal oxide coating.

As a carrier substrate any substrate may be chosen, that can be coated with a corresponding metal oxide coating. It may therefore be a metal, metal oxide or other inorganic material. Depending on their resistance also organic substrates are possible to be used for the coating process. It is very important, that the flakes used have a very low variation in thickness.

In principle, the connection mechanism works even with metal oxide coated mica platelets, but the distribution of these particle types over the polymer matrix hinder the formation of the structure in some respect, as the mica flakes on their longitudinal direction considered a more pronounced variation in thickness, than the plates obtained by the web coating process. This may lead to the above-mentioned entanglement.

In a preferred embodiment the flakes are chosen from metal oxide-coated glass flakes, metal oxide-coated silicon dioxide (or mica) or metal oxide-coated alumina flakes.

The average diameter of the flakes is usually between 1 and 500 µm, preferably between 5 and 200 µm and in particular 10-150 µm. Preferred smaller flake sizes are furthermore those in the range 1-100 µm, in particular 5-60 µm and 1-15 µm. The average thickness of the flakes is between 0.1 and 5 µm and preferably 0.1 to 1 µm.

The flakes are typically present between 2 wt.-% and 60 wt.-%, preferable 2 wt.-% and 50 wt.-%, more preferable 5 wt.-% to 40 wt.-%, more preferably 5 wt.-% to 25 wt.-%.

The coating composition according to the invention comprises an organic solvent. Examples are: halogenated hydrocarbons, ethers, such as, diethyl ether, 1,2-dimethoxyethane, tetrahydrofuran or dioxane; ketones, such as, for example, methyl ethyl ketone, acetone, cyclohexanone and the like; alcohols, such as methanol, ethanol, propanol, methoxypropanol, butanol and benzyl alcohol, (cyclo)aliphatic and/or aromatic solvents in the boiling range from about 150° C. to 180° C. or esters, such as butyl acetate, methoxypropylacetate. The solvents can be employed individually or in a mixture. Preferred are polar organic solvents like alcohols, such as methanol, ethanol, propanol, methoxypropanol, butanol and benzyl alcohol, (cyclo) aliphatic and/or aromatic solvents in the boiling range from about 150° C. to 180° C. or esters, such as butyl acetate, methoxypropylacetate.

The solvent can be used in any suitable amount, as long as good mixing of the compounds is possible. Typically the solvent is used in the ratio of 2:1 to 1:5 of binder and solvent in weight.

Conventional additives which may possibly be present in the coating composition according to the invention are depending on the particular intended use. The conventional coating additives such as pigments, pigment pastes, antioxidants, leveling and thickening agents, flow assistants, antifoams and/or wetting agents, fillers, catalysts, additional curing agents and additional curable compounds, etc. These additives can if appropriate be added to the mixture only immediately prior to processing. These additives are usually present by up to 5 wt.-%.

The coating composition may further comprise inorganic particles. Suitable particles are virtually all ceramic and glass systems, but also in some cases metals, semiconductors and customary fillers. They are preferably ceramic particles. Frequently, oxides, nitrides, carbides, carbonitrides, silicides or borides are used. It is also possible to use mixtures of different particles. Preference is given to using abrasive particles or hard substances. The particles may be surface-modified or -unmodified.

The particles are, for example, particles of metal including metal alloys, semimetal (e.g. B, Si and Ge) or metal compounds, in particular metal chalcogenides, more preferably the oxides and sulfides, nitrides, carbides, silicides and borides. It is possible to use one type of particles or a mixture.

Examples are (optionally hydrated) oxides such as ZnO, CdO, $SiO_2$, $GeO_2$, $TiO_2$, $ZrO_2$, $CeO_2$, $SnO_2$, $Al_2O_3$ (e.g. Amperit, boehmite, AlO(OH), also in the form of aluminum hydroxide), $B_2O_3$, $In_2O_3$, $La_2O_3$, $Fe_2O_3$ (e.g. hematite), $Fe_3O_4$, $Cu_2O$, CuO, $MnO_2$, $Ta_2O_5$, $Nb_2O_5$, $V_2O_5$, $MoO_3$ or $WO_3$; further chalcogenides, for example sulfides (e.g. CdS, ZnS, PbS and $Ag_2S$), selenides (e.g. GaSe, CdSe and ZnSe) and tellurides (e.g. ZnTe or CdTe); halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates including relatively complex silicates, for example sheet silicates, talc, zirconates, aluminates, stannates and the corresponding mixed oxides (e.g. indium tin oxide (ITO), antimony tin oxide (ATO), fluorine-doped tin oxide (FTO). Also useful are customary fillers, for example graphite, sulfates such as barite and gypsum, carbonates such as calcites, dolomites and chalks, sulfides such as zinc sulfide or lithopones, glass, and also oxides and silicates such as silicas, cristobalite, talc, kaolin and mica, provided that they are insoluble in the selected medium.

In another embodiment of the invention the particles are metal oxide selected from the group comprising $V_2O_5$, $CeO_2$, $MnO_2$ and CuO and mixtures thereof. These transition metal oxides can provide additional functionalities as described before. These oxides may also be present in minor amounts in other particles, like hard particles, e.g. as dopant or coating.

Preference is given to using abrasive powders for the particles. Examples of abrasive or hard powders, which are also referred to as abrasives, are powders of diamond, granite, pumice, tripel, silicon carbide, emery, aluminas, for example amperit and corundum, silicas such as Kieselguhr, quartz or abrasive sands, gypsum, boron carbide and other oxides, borides, silicides, carbides, carbonitrides and nitrides.

In one embodiment, the Mohs' hardness value of the particles is greater than 5. In certain embodiments, the Mohs' hardness value of the particles, such as silica, is greater than 6.

The particles are preferably selected from particles consisting of at least one of boron carbide, silicon carbide and/or silicon nitride.

The particle size of the particles is not particularly restricted. Appropriately, the mean particle diameter is, for example, in the range from at least 0.1 μm, preferably at least 0.5 μm and more preferably at least 1 μm up to not more than 100 μm, more preferably not more than 50 μm and particularly preferably not more than 20 or 10 μm. It is also possible to use mixtures of particles of different particle size. For example, SiC UF-10 with coarser UF-05 and even finer UF-15 can be used in combination. In addition, it is also possible to add finer particle fractions down to the nm range, as are customary, for example, in nanocomposites which are described, for example, in DE 42 12 633 A1. It is also possible to use very fine particles of such nanoscale solid particles with a mean particle diameter below 0.1 μm alone.

As in the later data too, the mean particle diameter is based on the volume average determined, the distributions being determined by using laser diffraction processes (evaluation according to Mie) in the particle size range from 1 to 2000 μm and UPA (ultrafine particle analyzer, Leeds Northrup (laser optics)) in the range from 3.5 nm to 3 μm. In the range of intersection from 1 to 3 μm, reference is made here to the measurement with UPA.

The particles used may also be surface-modified. For example, $SiO_2$ particles, especially quartz particles, may be surface-modified with epoxy or amino groups or other functional groups.

The modification of particle surfaces is a known process, as described by the applicant for nanoscale solid particles, for example, in WO 93/21127 A1 or WO 96/31572 A1. The preparation of the surface-modified particles can in principle be carried out in two different ways, specifically firstly by modifying already prepared particles and secondly by preparing particles with use of one or more compounds which possess appropriate functional moieties.

The inorganic particles are usually present between 5 wt.-% to 30 wt.-%, preferably 10 to 25 wt.-%.

In a preferred embodiment the coating composition comprises not more than 40 wt.-% in flakes and inorganic particles, more preferred between 15 wt.-% to 40 wt.-% or between 20 wt.-% to 40 wt.-%.

In another embodiment of the invention the coating composition comprises a fluorine-containing polymer or oligomer. Such polymers are reactive perfluoropolyethers. The fluorine content improves the barrier properties of the cured coating against water penetration due to the hydrophobic character of the fluorine containing compound. In an embodiment, the perfluoropolyether chemically reacts with the binder, forming a plurality of covalent bonds between the perfluoropolyether and the polymer (reactive fluorine containing oligomer or polymer). Furthermore, the perfluoropolyether may be condensable with the binder. In an embodiment, the perfluoropolyether comprises Fluorolink® D10H (Solvay Solexis). This compound may alternatively be referred to as D10H herein. In certain embodiments, about 0.01 to 2 wt.-% of the fluorine containing polymer, on the basis of the total weight of the coating composition except solvent, may be utilized, preferably 0.28 to 0.5 wt.-%. In other embodiments, non-reactive fluoro-compounds may be used to accomplish this purpose.

In one preferred embodiment of the invention the coating composition further comprises a cross-linking co-monomer or oligomer or polymer for cross-linking the binder. This co-monomer may comprise at least one functional group, which is reactive with the curing reaction of the binder. It may as well be a different cross-linking reaction. Such a cross-linking can improve the barrier properties of the cured coating. These comonomers may carry independent functional groups, like polar or apolar groups, or can be used to introduce halogens like fluorine groups into the coating composition. In a preferred embodiment of the invention the co-monomer is a reactive fluorine containing oligomer or polymer as described above.

In another embodiment of the invention the binder further comprises a co-monomer comprising at least one cyano group and/or imine group. These reactive groups are beneficial since they can react with hydrogen sulfide. The co-monomer can be a monomer, oligomer or polymer based on a cyano and/or imine group-containing compound. Such a compound comprises functional groups compatible with functional groups on the resin. The compound can be polymerized with the curing reaction of the resin. It may also react only with further functional groups present in the resin. Preferably the compound acts as crosslinker, it contains more than two functional groups to react with the resin.

For epoxy resins or polyurethane resins such a compound may be compounds derived from cyanoguanidines. Such compounds can be oligomeric cyanoguanidines as dicyandiamide or monomeric cyanoguanidine.

The co-monomer is typically used in 0.01 wt.-% to 20 wt.-%, preferably 2 wt.-% to 15 wt.-%.

The co-monomer comprising a cyano and/or imine group is especially beneficial for barriers against gaseous corrosive media, preferably in combination with a fluorine containing comonomer.

It is also possible to use a mixture of co-monomers.

In another embodiment of the invention the coating composition further comprises at least one rheology additive.

Such rheology additives are for example waxes capable of providing the features of anti-settling, resistance to abrasion, and orientation of the flakes present in the coating composition.

Particularly advantageous is the use of a dispersion of wax in a solvent for causing orientation of flakes in the coating composition. The waxes usable for these purposes include synthetic waxes, polyethylene waxes, polytetrafluoroethylene (PTFE) waxes, high-density polyethylene waxes, polypropylene waxes, ethylene copolymers, ethylene acrylic acid (EAA) copolymers, and ethylene vinyl acetate (EVA) copolymers.

In a further embodiment of the invention the rheology additive is chosen from the group containing an ethylene copolymer and/or an ethylene acrylic acid copolymer.

To obtain an optimal orientation of the flakes it is preferable to use ethylene vinyl acetate (EVA) copolymers and/or ethylene acrylic acid (EAA) copolymers.

The rheology additives are usually used as dispersion of wax in solvent, for example with a base of ethylene vinyl acetate (EVA) copolymers dispersed in one or more solvents, such as xylene, n-butyl acetate, n-butanol, and mixtures thereof.

The rheology additives are present at 0.05 wt.-% to 5 wt.-%, preferably 1 wt.-% to 3 wt.-%.

Another object of the invention is a substrate having a highly structured composite coating with barrier properties for corrosive gaseous and/or liquid media, wherein the coating comprises a cured composition as described before.

As substrate all customary materials may be coated. Examples of a suitable substrate are substrates made of metal, semiconductors, glass, ceramic including porous ceramics, glass ceramic, plastic, wood, paper, building materials or inorganic-organic composite materials. The substrates may be pretreated, for example by sand blasting, glass bead blasting, a corona or plasma treatment or with a preliminary coating such as a lacquer coating (lacquered surfaces), an enamel coating, a paint coating or a metalized surface, or by impregnation.

Examples of metal substrates include, for example, copper, aluminum, magnesium, brass, iron, steel and zinc. Examples of semiconductors are silicon, for example in the form of wafers, and indium tin oxide layers (ITO layers) on glass. The glass used may be any conventional glass types, for example silica glass, borosilicate glass or soda-lime silicate glass. Examples of plastic substrates are polycarbonate, polymethyl methacrylate, polyacrylates, polyethylene terephthalate and Cellulose acetate (TAC).

Especially for optical or optoelectronic applications, transparent substrates are suitable, for example of glass or plastic. Examples of building materials are stones, concrete, tiles, plasterboard or bricks.

The coating on the substrate has a thickness of typically 5 µm to 500 µm, preferably between 8 µm and 200 µm, more preferably between 8 µm and 100 µm or 8 µm and 50 µm. In a preferred embodiment the coating has a thickness between 8 µm and 40 µm.

The object of the invention is also achieved by a process. In what follows, individual steps of a process will be described in more detail. The steps do not necessarily have to be performed in the order given in the text. Also, further steps not explicitly stated may be part of the method.

One object of the invention is a process for producing a highly structured composite coating with barrier properties for corrosive gaseous and/or liquid media, wherein the process comprising applying a coating composition to a substrate and curing the coating composition.

In a first step the components of the coating composition are mixed by suitable means, e.g. dissolver disk, bead mill.

The composition may be applied to the substrate in any customary manner. It is possible to use all common coating processes. Examples are spin-coating, (electro) dip-coating, knife-coating, spraying, squirting, casting, painting, printing, flow-coating, knife-casting, slot-coating, meniscus-coating, curtain-coating and roller application.

The coating obtained has a typical wet film thickness between 20 µm and 500 µm, preferably 60 µm to 150 µm.

Preferred mode of application is spraying.

This is followed by curing. Since the curing, by its nature, depends essentially upon the binder systems used, no specific statements can be made. Those skilled in the art know what curing conditions are appropriate for the particular known binder systems. As stated, the systems may be oxidatively curing, cold-curing or thermally curing or irradiation-curable systems. In case of thermal curing the coated substrate may be cured for 10 minutes to 2 hours at a temperature between 150° C. and 300° C.

As part of the final curing process the binder is forming a polymer matrix in strong interaction with the metal oxide-coated flakes. This results in a highly structured composite material with excellent barrier and adhesion properties and abrasion stability. To increase the abrasion resistance further if necessary, any other hard material particles are added in the mixing process. Furthermore, to the polymer matrix additional cross-linking co-monomers are added to allow the active matrix interaction with special corrosion-active molecules and thus to achieve a long-term effects on the barrier effect and a strong corrosion protection. Moreover, the additional cross-linking co-monomers can also improve the impact resistance of the coatings.

In a particularly preferred embodiment, functional short-chain fluorooligomers, preferably with hydroxyl groups, are used as co-monomers as described above.

There is also no restriction with regard to the equipment which can be coated fully or partly with the inventive composition. Due to the special properties the coating is especially suited for corrosive environments, e.g. under hydrothermal conditions (elevated pressure and temperature, e.g. >5 bar and 100° C. to 200° C.).

For example, the composition is suitable for objects in the vehicle sector, for example automobiles, ships, aircraft, in engine construction, pipes for oil and gas production and transport, recipient for gas transportation, high pressure gas cylinders, in the household, in mechanical engineering, in the chemicals industry, the foods industry, the food processing industry, process technology, especially microelectronics, in nanotechnology, in the hygiene sector, such as in the bathroom sector, in hotels and in the medical sector, especially for hospitals.

Examples of treatment objects or treatable parts of objects are beds, instruments, vessels, especially in hospitals, household equipment, kitchen fittings, bathroom fittings such as bathtubs, tiles, shower cubicles, washbasins, toilets, fittings, exteriors of machines and other objects, mechanically stressed parts, for example transport systems, tubes, mechanical processing systems, kneaders, mills, mixers, food packaging, roof tiles, windows, facades, containers of all types for dry and liquid goods, aqueous systems and nonaqueous systems and silos, wind rotors or turbines, rotors for tidal power plants.

Detailed Specification for Liquid and Gaseous Corrosive Environment

Depending on the desired properties of the cured coating, the coating composition may be optimized. For liquid corrosive environments the addition of hard particles is preferred in order to increase the abrasion resistance of the cured coating.

For such environments the coating composition may comprise 50 wt.-% to 98 wt.-% binder; 2 to 25 wt.-% flakes, 0 to 25 wt.-% hard particles, 0 to 0.5 wt.-% of a fluorine containing comonomer and 0 to 3 wt.-% of a rheology additive, preferably 50 wt.-% to 93 wt.-% binder; 2 to 25 wt.-% flakes, 5 to 25 wt.-% hard particles, 0 to 0.5 wt.-% of a fluorine containing comonomer and 0 to 3 wt.-% of a rheology additive. The cured coatings typically have a thickness between 7.5 µm and 100 µm.

In the case of gaseous corrosive environments the addition of cross-linking co-monomers like cyanoguanidine is preferred. Such compositions may not comprise any hard particles.

For such environments the coating composition may comprise 50 wt.-% to 98 wt.-% binder; 2 to 25 wt.-% flakes, 0 to 25 wt.-% hard particles, 0 to 0.5 wt.-% of a fluorine containing comonomer, 0 to 20 wt.-% of a cross-linking co-monomer and 0 to 3 wt.-% of a rheology additive, preferably 50 wt.-% to 96 wt.-% binder; 2 to 25 wt.-% flakes, 0 to 25 wt.-% hard particles, 0 to 0.5 wt.-% of a fluorine containing co-monomer, 2 to 20 wt.-% of a cross-linking co-monomer and 0 to 3 wt.-% of a rheology additive. The cured coatings typically have a thickness between 15 µm and 100 µm.

The tables 1 and 2 show different results for different coating compositions with the following abbreviations: CS=Crystal Silver flakes (Merck); LS=Lapis Sunlight flakes (Merck); CTX=Ceratix 8461 (Byk); CF=Cerafak 100 (Byk); PS=P 104 S (Byk); FL=Fluorolink D10H (Solvay). The samples with labelled with H (table 1) are compositions especially for liquid environments, while the samples labelled with G (table 2) are preferred for gaseous environments. Some of the specific compositions will be presented in the example section. The samples H193, H139 are comparative examples in table 1. The samples G046, G014, G099 are comparative examples in table 2.

The FIGS. 2A and 2B show light microscope and scanning electron microscope (SEM) pictures from the surface of a sample from the different points of the coated substrate (arrows). FIG. 3 shows the effect of orienting additive on the orientation of the flakes in the cured layers.

There follow examples to illustrate the invention.

Materials and Methods

Autoclave Test

Experiments for the $H_2S$-tests were done in a lab-scale $H_2S$-test-facility. The autoclave (Model LaS-4-13-MCS-J, Laborautoklav 13 l, 4 bars) with stainless steel accessories (discharge cock, safety relief valve, manometer and fittings) was provided by Adolf Wolf SANOclav, Bad Überkingen-Hausen. The gas mixture for the tests was delivered by LINDE GAS Deutschland, Düsseldorf. It contains 10% $H_2S$ and 90% $CO_2$. For safety aspects the test facility was build up in a lockable skeleton container.

The $H_2S$ test was accomplished as follows: Water containing 5 wt.-% sodium chloride is put into the vessel to form the steam during the proceeding of $H_2S$-test. The 5×5 cm samples are mounted on a base frame and put into the vessel, so that they have no contact with the salty water (samples denoted "G") or are immersed with 50% of their size into the salty water (samples denoted "H") on the bottom of the vessel. The lit is closed and the autoclave is now flooded with the gas mixture from the extern gas bottle up to 1.0 bar inner pressure. The vessel is now heated to 85° C., thereby increasing the pressure in the vessel up to 1.4 bars. Corrosion time is counted from the point in time of reaching the test parameters.

After proceeding time (normally after every 14 days) the vessel is cooled down to room temperature and the gas mixture is allowed to discharge. Then the lit is opened and a certain amount of samples are removed. The rest stays in the vessel and the process is started once more like described before.

The removed samples are cleaned only with water and a brush using no other cleaning agents and toweled. They are now ready for the examination by cross cut/tape test (CC/TT). A successful sample will have to reach the 720 hrs in this test and fulfill the CC/TT test. The results are shown in table 1 and table 2.

Cross Cut—Tape Test (CC/TT) According to DIN ISO 2409

The cross cut—tape test, performed after the $H_2S$-test, gives information about the adhesion of coating material to the sample surface after the corrosion test. It is done on the backside of the 5×5 cm samples. A knife with 6 parallel blades (distance 1 mm) is cut over the coating surface so that the coating layer is cut through. The same is done in perpendicular thus giving a cross cut. The sample is brushed after the cross cut to remove detached coating material. The remaining amount of coating on the surface is examined and judged according to a rating (see FIG. 1). After that a tape is put on the surface and pulled down. Also the remaining coating is examined. All samples that show higher values than CC/TT 1/1 do not fulfill the requirement of good adhesion. "CC/TT liquid" means the part of the sample immersed into brine, "CC/TT gas" means the part of the sample in the gas phase. The results are shown in table 1 and table 2.

Vibrational Tensile Testing (Fatigue Test)

Tests were done on both side coated flat tensile specimens using an Instron testing machine which has been cooled down with liquid $N_2$ to −40° C. The sample stretching was performed within a loading range from 1 to 10 kN. The used frequency was 1.0 Hz. So the required 15000 cycles were done in about 4 hours. Crack formation was investigated visually, by light microscopic and by scanning electron microscopy (SEM).

The requirement for a sample to fulfill the test is no crack after 15.000 cycles.

The results are given as "Fatigue test" in table 2 and as can be observed in FIGS. 2A and 2B, there are no cracks visible.

Taber Abrader According to DIN 53754

For this test 2×500 g, CS-17 rolls were used for 400 cycles. Weight loss is given in mg. Samples showing a weight loss of <5 mg fulfill the requirement. The results are shown in table 1.

Neutral Salt Spray Test (SST)

This test was performed according to DIN 50021. The samples were investigated for blistering, delamination and subsurface migration. The duration of the sample is given in hours. All samples that pass the requirement of 300 hrs SST fulfill the test. The 300 hrs are based on the corrosion stability required from the US norm for submarine boats. The results are shown in table 1.

Impact Test (Ball Drop Test)

The impact behaviour was tested by the ball drop test using a steel ball with a diameter of 10 mm loaded up to 1500 g. The falling height was chosen to be 1 m. The impact area has been inspected visually with the naked eye and with a magnification glass for delamination and cracking. The rating has been done as follows:

I1: no damage
I2: small scratch, sharp edge
I3: scratch with wall
I4: scratch with wall and cracks
I5: 50% spalling A successful sample will have to obtain a minimum of I2.

In the following sections examples are given to illustrate the invention.

EXAMPLES

Example 1

Composition for Liquid Corrosive Media H 247

10.40 g epoxy resin of epichlorohydrin-bisphenol A-type (Cytec Beckopox EP307) are dissolved in 20.80 g methoxypropyl acetate (CAS 108-65-6). To this are added 4.90 g of the phenolic resin solution Cytec Phenodur PR722/53BG/B (PR722), 0.07 g Fluorolink D10H (Comonomer 2 FL), 3.58 g BYK Ceratix 8461 (CTX) and 2.70 g Borcarbid HD20 (H. C. Starck). The mixture is ground in a bead mill (VMA Getzmann Dispermat CA with grinding system APS, zirconium oxide beads 1.2-1.4 mm). The beads are then removed and the yield is determined. At a yield of 75% 1.34 g (=1.79 g*75%) Merck Colorstream Lapis Sunlight T20-04 WNT (Pigment 1) is stirred in with a dissolver disc. Application is done with a handgun SATA minijet on sand blasted steel plates (Wet film thickness of 80-100 μm), the curing takes place for 30 minutes at 200° C. This gives a green-gray, shiny, homogeneous, well adherent layer with excellent stability in the ball drop test after curing. The rating of the impact test was I2.

After the entire set of test (autoclave, SST, CC/TT, Taber abrader) were performed can be observed that this example fulfill the requirements as can be derived from table 1.

Example 2

Composition for Liquid Corrosive Media H 253

9.60 g Epoxy resin of epichlorohydrin-bisphenol A-type (Cytec Beckopox EP307) are dissolved in 19.20 g methoxypropyl acetate (CAS 108-65-6). To this are added 4.50 g of the phenolic resin solution Cytec Phenodur PR722/53BG/B, 0.06 g Fluorolink D10H, 3.30 g BYK Ceratix 8461 and 2.48 g Borcarbid HD20 (H. C. Starck). The mixture is ground in a bead mill (VMA Getzmann Dispermat CA with grinding system APS, zirconium oxide beads 1.2-1.4 mm). The beads are then removed and the yield is determined. At a yield of 75% 1.24 g (=1.65 g*75%) Merck Xirallic Crystal Silver T60-10 SW (Pigment 2) is stirred in with a dissolver disc. Application is done with a handgun SATA minijet on sand blasted steel plates (Wet film thickness of 80-100 μm), the curing takes place for 30 minutes at 200° C. This gives a green-gray, shiny, homogeneous, well adherent layer with excellent stability in the ball drop test after curing. The rating of the impact test was I2.

After the entire set of test (autoclave, SST, CC/TT, Taber abrader) were performed can be observed that this example fulfill the requirements as can be derived from table 1.

Example 3

Composition for Liquid Corrosive Media H 226

11.30 g Epoxy resin of epichlorohydrin-bisphenol A-type (Cytec Beckopox EP307) are dissolved in 22.60 g methoxypropyl acetate (CAS 108-65-6). To this are added 5.30 g the phenolic resin solution Cytec Phenodur PR722/53BG/B, 0.07 g Fluorolink D10H and 2.64 g Borcarbid HD20 (H. C. Starck). The mixture is ground in a bead mill (VMA Getzmann Dispermat CA with grinding system APS, Zirconium oxide beads 1.2-1.4 mm). The beads are then removed and the yield is determined. At a yield of 75% 0.66 g (=0.88 g*75%) Merck Colorstream Lapis Sunlight T20-04 WNT is stirred in with a dissolver disc. Application is done with a handgun SATA minijet on sand blasted steel plates (Wet film thickness of 80-100 μm), the curing takes place for 30 minutes at 200° C. This gives a green-gray, shiny, homogeneous, well adherent layer with excellent stability in the ball drop test after curing. The rating of the impact test was I2.

After the entire set of test (autoclave, SST, CC/TT, Taber abrader) were performed can be observed that this example fulfill the requirements as can be derived from table 1.

Example 4

Composition for Liquid Corrosive Media H 232

10.40 g Epoxy resin of epichlorohydrin-bisphenol A-type (Cytec Beckopox EP307) are dissolved in 20.80 g methoxypropyl acetate (CAS 108-65-6). To this are added 4.90 g of the phenolic resin solution Cytec Phenodur PR722/53BG/B, 0.07 g Fluorolink D10H and 3.02 g Borcarbid HD20 (H. C. Starck). The mixture is ground in a bead mill (VMA Getzmann Dispermat CA with grinding system APS, zirconium oxide beads 1.2-1.4 mm). The beads are then removed and the yield is determined. At a yield of 75% 3.02 g (=4.02 g*75%) Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a green-gray, shiny, homogeneous, well adherent layer with excellent stability in the ball drop test after curing. The rating of the impact test was I2.

After the entire set of test (autoclave, SST, CC/TT, Taber abrader) were performed can be observed that this example fulfill the requirements as can be derived from table 1.

Comparative example 1 (without flakes) for liquid corrosive media: H 139

12.80 g Epoxy resin of epichlorohydrin-bisphenol A-type (Cytec Beckopox EP307) are dissolved in 25.60 g methoxypropyl acetate (CAS 108-65-6). To this are added 6.00 g the phenolic resin solution Cytec Phenodur PR722/53BG/B, 0.08 g Fluorolink D10H and 5.36 g Borcarbid HD20 (H. C. Starck). The mixture is ground in a bead mill (VMA Getzmann Dispermat CA with grinding system APS, zirconium oxide beads 1.2-1.4 mm). The beads are then removed. Application is done with a handgun SATA minijet on sand blasted steel plates (Wet film thickness of 80-100 µm), the curing takes place for 30 minutes at 200° C. This gives a green-gray, shiny, homogeneous, well adherent layer with excellent stability in the ball drop test after curing. The rating of the impact test was I2.

After the entire set of test (autoclave, SST, CC/TT, Taber abrader) were performed can be observed that this example did not fulfill the requirements as can be derived from table 1. Due to SST failed.

Example 5

Composition for Gaseous Corrosive Media G 089

12.40 g Epoxy resin of epichlorohydrin-bisphenol A-type (Cytec Beckopox EP307) are dissolved in 24.80 g methoxypropyl acetate (CAS 108-65-6). To this are added 5.85 g the phenolic resin solution Cytec Phenodur PR722/53BG/B, 0.08 g Fluorolink D10H, 8.85 g BYK Ceratix 8461 and 2.00 g cyanoguanidine (CAS 461-58-5). The mixture is ground in a bead mill (VMA Getzmann Dispermat CA with grinding system APS, zirconium oxide beads 1.2-1.4 mm). The beads are then removed and the yield is determined. At a yield of 75% 1.50 g (=2.00 g*75%) Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a bright golden-green, homogeneous, well-adhering layer.

After the entire set of test (autoclave, SST, CC/TT) were performed can be observed that this example fulfill the requirements as can be derived from table 2. Also for this example the fatigue test was performed successfully (FIG. 2b).

Example 6

Composition for Gaseous Corrosive Media G 055

16.00 g Epoxy resin of epichlorohydrin-bisphenol A-type (Cytec Beckopox EP307) are dissolved in 32.50 g methoxypropyl acetate (CAS 108-65-6). To this are added 7.50 g the phenolic resin solution Cytec Phenodur PR722/53BG/B, 0.10 g Fluorolink D10H, 11.00 g BYK Ceratix 8461 and 3.00 g cyanoguanidine (CAS 461-58-5). The mixture is ground in a bead mill (VMA Getzmann Dispermat CA with grinding system APS, zirconium oxide beads 1.2-1.4 mm). The beads are then removed and the yield is determined. At a yield of 80% 4.72 g (=5.90 g*80%) Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a bright golden-green, homogeneous, well adherent layer.

After the entire set of test (autoclave, SST, CC/TT) were performed can be observed that this example fulfill the requirements as can be derived from table 2. Also for this example the fatigue test was performed successfully (FIG. 2a).

Example 7

Composition for Gaseous Corrosive Media G 053

9.60 g Epoxy resin of epichlorohydrin-bisphenol A-type (Cytec Beckopox EP307) are dissolved in 19.50 g methoxypropyl acetate (CAS 108-65-6). To this are added 4.50 g the phenolic resin solution Cytec Phenodur PR722/53BG/B, 0.06 g Fluorolink D10H, 3.60 g BYK Cerafak 100 (CFK) and 1.80 g cyanoguanidine (CAS 461-58-5). The mixture is ground in a bead mill (VMA Getzmann Dispermat CA with grinding system APS, zirconium oxide beads 1.2-1.4 mm). The beads are then removed and the yield is determined. At a yield of 75% 2.67 g (=3.56 g*75%) Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a bright golden-green, homogeneous, well-adhering layer.

After the entire set of test (autoclave, SST, CC/TT) were performed can be observed that this example fulfill the requirements as can be derived from table 2.

Example 8

Composition for Gaseous Corrosive Media G 039

13.60 g Epoxy resin of epichlorohydrin-bisphenol A-type (Cytec Beckopox EP307) are dissolved in 13.60 g methoxypropyl acetate (CAS 108-65-6). To this are added 6.40 g the phenolic resin solution Cytec Phenodur PR722/53BG/B, 0.09 g Fluorolink D10H and 5.13 g BYK Cerafak 100 (CFK). The mixture is stirred with a dissolver disc (VMA Getzmann Dispermat CA). 5.55 g Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a bright golden-green, homogeneous, well-adhering layer.

After the entire set of test (autoclave, SST, CC/TT) were performed can be observed that this example fulfill the requirements as can be derived from table 2.

Example 9

Composition for Gaseous Corrosive Media G 037

13.60 g Epoxy resin of epichlorohydrin-bisphenol A-type (Cytec Beckopox EP307) are dissolved in 13.60 g methoxypropyl acetate (CAS 108-65-6). To this are added 4.50 g the phenolic resin solution Cytec Phenodur PR722/53BG/B, 0.09 g Fluorolink D10H and 9.38 g BYK Ceratix 8461 (CTX). The mixture is stirred in with a dissolver disc (VMA Getzmann Dispermat CA). 6.62 g Merck Colorstream Lapis Sunlight T20-04 WNT is stirred in with a dissolver disc. Application is done with a handgun SATA minijet on sand blasted steel plates (Wet film thickness of 80-100 µm), the curing takes place for 30 minutes at 200° C. This gives a bright golden-green, homogeneous, well-adhering layer.

After the entire set of test (autoclave, SST, CC/TT) were performed can be observed that this example fulfill the requirements as can be derived from table 2.

Example 10

Composition for Gaseous Corrosive Media G 035

13.60 g Epoxy resin of epichlorohydrin-bisphenol A-type (Cytec Beckopox EP307) are dissolved in 27.20 g methoxy-propyl acetate (CAS 108-65-6). To this are added 6.40 g the phenolic resin solution Cytec Phenodur PR722/53BG/B, 0.09 g Fluorolink D10H and 4.27 g Merck Colorstream Lapis Sunlight T20-04 WNT. The mixture is mixed with a dissolver disc (VMA Getzmann Dispermat CA). Application is done with a handgun SATA minijet on sand blasted steel plates (Wet film thickness of 80-100 µm), the curing takes place for 30 minutes at 200° C. This gives a bright golden-green, homogeneous, well-adhering layer. A cross-section view from scanning electron microscopy is shown in FIG. 3a.

After the entire set of test (autoclave, SST, CC/TT) were performed can be observed that this example fulfill the requirements as can be derived from table 2.

Example 11

Composition for Gaseous Corrosive Media G 049

9.70 g Epoxy resin of epichlorohydrin-bisphenol A-type (Cytec Beckopox EP307) are dissolved in 19.40 g methoxy-propyl acetate (CAS 108-65-6). To this are added 4.50 g the phenolic resin solution Cytec Phenodur PR722/53BG/B, 0.06 g Fluorolink D10H, 6.60 g Byk Ceratix 8461 and 3.09 g Merck Colorstream Lapis Sunlight T20-04 WNT. The mixture is mixed with a dissolver disc (VMA Getzmann Dispermat CA). Application is done with a handgun SATA minijet on sand blasted steel plates (Wet film thickness of 80-100 µm), the curing takes place for 30 minutes at 200° C. This gives a bright golden-green, homogeneous, well-adhering layer. A cross-section view from scanning electron microscopy is shown in FIG. 3b.

After the entire set of test (autoclave, SST, CC/TT) were performed can be observed that this example fulfill the requirements as can be derived from table 2.

Example 12

Composition for Gaseous Corrosive Media G 048

9.70 g Epoxy resin of epichlorohydrin-bisphenol A-type (Cytec Beckopox EP307) are dissolved in 19.40 g methoxy-propyl acetate (CAS 108-65-6). To this are added 4.50 g the phenolic resin solution Cytec Phenodur PR722/53BG/B, 0.06 g Fluorolink D10H, 3.60 g Byk Cerafak 100 and 3.11 g Merck Colorstream Lapis Sunlight T20-04 WNT. The mixture is mixed with a dissolver disc (VMA Getzmann Dispermat CA). Application is done with a handgun SATA minijet on sand blasted steel plates (Wet film thickness of 80-100 µm), the curing takes place for 30 minutes at 200° C. This gives a bright golden-green, homogeneous, well-adhering layer. A cross-section view from scanning electron microscopy is shown in FIG. 3c.

After the entire set of test (autoclave, SST, CC/TT) were performed can be observed that this example fulfill the requirements as can be derived from table 2.

Comparative Example 2

(Without Flakes and without Co-Monomer 1): For Gaseous Corrosive Media G 046

12.20 g Epoxy resin of epichlorohydrin-bisphenol A-type (Cytec Beckopox EP307) are dissolved in 24.40 g methoxy-propyl acetate (CAS 108-65-6). To this are added 5.70 g the phenolic resin solution Cytec Phenodur PR722/53BG/B and 0.08 g Fluorolink D10H. The mixture is mixed with a dissolver disc (VMA Getzmann Dispermat CA). Application is done with a handgun SATA minijet on sand blasted steel plates (Wet film thickness of 80-100 µm), the curing takes place for 30 minutes at 200° C. This gives a transparent yellow-brown, shiny, homogeneous, well-adhering layer.

After the entire set of test (autoclave, SST, CC/TT) were performed can be observed that this example did not fulfill the requirements as can be derived from table 2 in the CC/TT.

Comparative Example 3

With Glass Flakes Having NO Metal Oxide on the Surface): For Gaseous Corrosive Media G 014

13.60 g Epoxy resin of epichlorohydrin-bisphenol A-type (Cytec Beckopox EP307) are dissolved in 27.20 g methoxy-propyl acetate (CAS 108-65-6). To this are added 6.40 g the phenolic resin solution Cytec Phenodur PR722/53BG/B, 0.09 g Fluorolink D10H and 1.90 g Microglas RCF 015 (Mühlmeier). The mixture is mixed with a dissolver disc (VMA Getzmann Dispermat CA). Application is done with a handgun SATA minijet on sand blasted stell plates (Wet film thickness of 80-100 µm), the curing takes place for 30 minutes at 200° C. This gives a transparent yellow-brown, shiny, homogeneous, well-adhering layer.

After the entire set of test (autoclave, SST, CC/TT) were performed can be observed that this example did not fulfill the requirements as can be derived from table 2 in the CC/TT.

While the present inventions have been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from their spirit or essential characteristics. The described embodiments are considered in all respects to be illustrative and not restrictive. The scope of the inventions is, therefore, indicated by the appended claims, rather than by the foregoing description. All changes which come within the meaning and range of equivalence of the claims are to be embraced within their scope.

LIST OF TABLES AND FIGURES

Table 1: The table shows different results for different coating compositions with the following abbreviations:

CS=Crystal Silver flakes (Merck); LS=Lapis Sunlight flakes (Merck); CTX=Ceratix 8461 (Byk); CF=Cerafak 100 (Byk); PS=P 104 S (Byk); FL=Fluorolink D10H (Solvay). The samples with labelled with H are compositions especially for liquid environments.

Table 2: The table shows different results for different coating compositions with the following abbreviations: CS=Crystal Silver flakes (Merck); LS=Lapis Sunlight flakes (Merck); CTX=Ceratix 8461 (Byk); CF=Cerafak 100 (Byk); PS=P 104 S (Byk); FL=Fluorolink D10H (Solvay). The samples with labelled with G are preferred for gaseous environments.

BRIEF DESCRIPTION OF THE DRAWINGS

FIG. 1: The figure shows the rating for the Cross Cutt—Tape Test (CC/TT) according to DIN ISO 2409

Figure 2A:
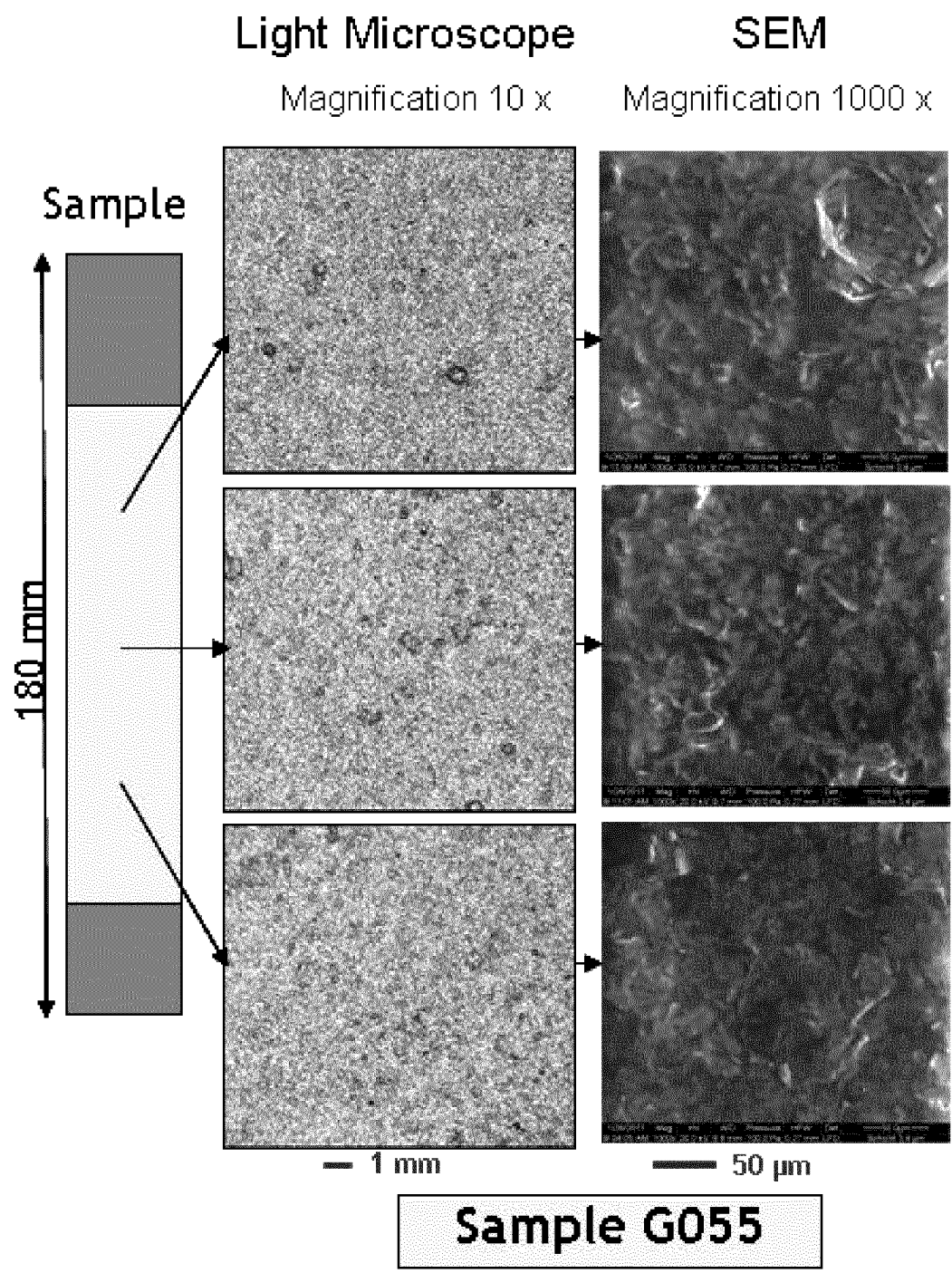
FIG. 2A: The figure shows results from the Fatigue test for sample G055.
Figure 2B:
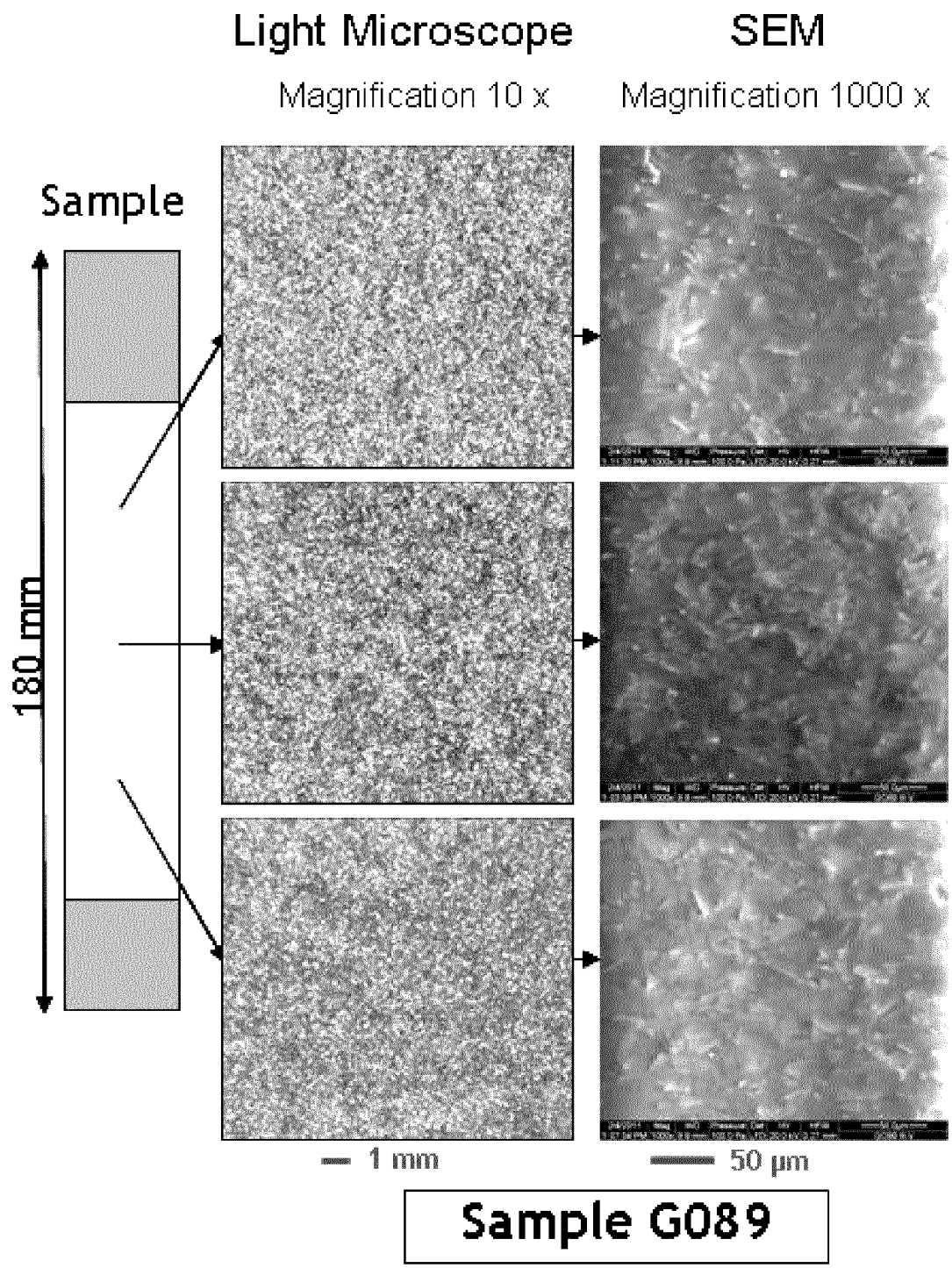
FIG. 2B: The figure shows results from the Fatigue test for different sample G089.
Figure 3:
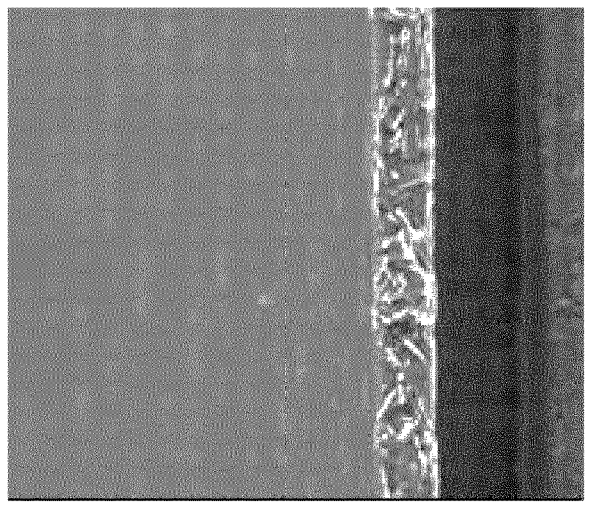
FIG. 3: SEM images from a cross section from different samples. From the top: a) G035 20 wt.-% Lapis Sunlight; b) G049 20 wt.-% Lapis Sunlight+2.0% Ceratix 8461; c) G048 20 wt.-% Lapis Sunlight+2.3% Cerafak 100.
Figure 3:
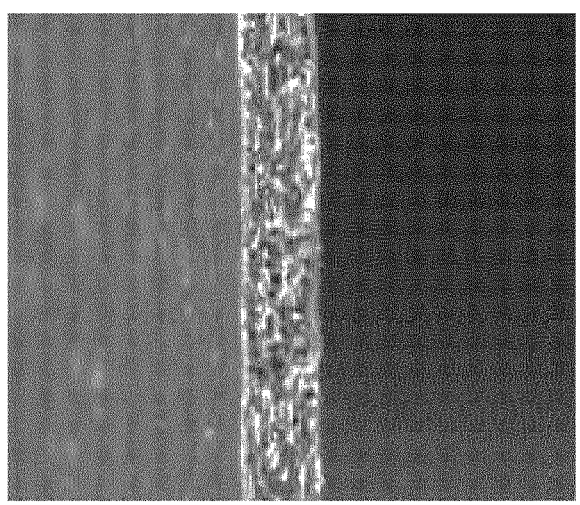
Figure 3:
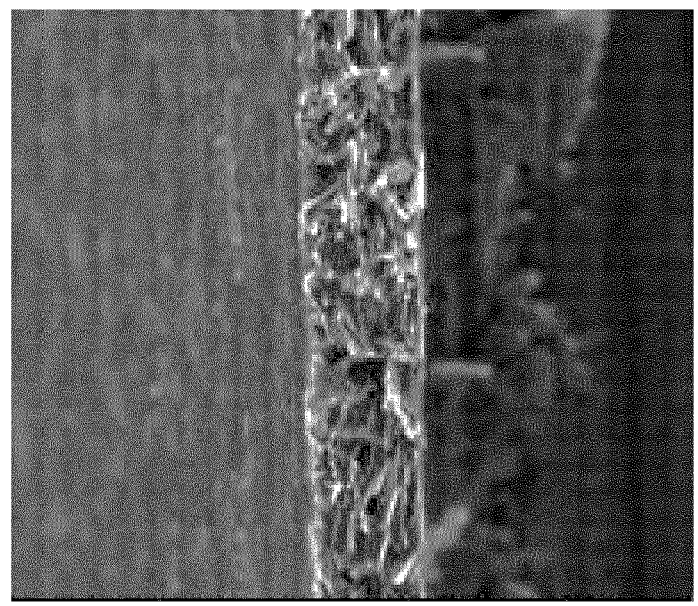

| Sample | Flake 1 Lapis Sunlight wt.-% | Flake 2 Crystal Silver wt.-% | Boron carbide HD 20 wt.-% | Rheo. Additive wt.-% | thickness [μm] | H₂S autoclave test | CC/TT liquid | CC/TT gas. | SST [h] | Taber Δm [mg] | EP307 wt.-% | PR722 wt.-% | Co-monomer 2 FL wt.-% |
|---|---|---|---|---|---|---|---|---|---|---|---|---|---|
| H193 | — | — | — | — | 30.40 | 720 h | 2/3 | 5/5 | — | 6.8 | 79.60 | 19.90 | 0.50 |
| H139 | — | — | 25% HD20 | — | 7.00 | 720 h | 0/0 | 0/0 | — | 1.9 | 59.70 | 14.93 | 0.38 |
| H226 | 5% LS | — | 15% HD20 | — | 7.81 | 720 h | 0/0 | 0/0.5 | 408 | 2.0 | 63.68 | 15.92 | 0.40 |
| H144 | 10% LS | — | — | — | 15.46 | 720 h | 0/1 | 0/2 | 672 | 7.3 | 71.64 | 17.91 | 0.45 |
| H228 | 10% LS | — | 10% HD20 | — | 7.88 | 720 h | 0/0 | 0/0 | 408 | 1.5 | 63.68 | 15.92 | 0.40 |
| H229 | 10% LS | — | 15% HD20 | — | 8.37 | 720 h | 0/0 | 0/0 | 576 | 1.8 | 59.70 | 14.93 | 0.38 |
| H246 | 10% LS | — | 15% HD20 | 1% CTX | 11.08 | 720 h | 0/0 | 0/0 | 1008 | 3.2 | 58.90 | 14.73 | 0.38 |
| H247 | 10% LS | — | 15% HD20 | 2% CTX | 16.60 | 720 h | 0/0 | 0/0 | 1008 | 3.1 | 58.10 | 14.53 | 0.38 |
| H248 | 10% LS | — | 15% HD20 | 3% CTX | 14.85 | 720 h | 0/0 | 0/0 | 1008 | 3.0 | 57.30 | 14.33 | 0.38 |
| H230 | 10% LS | — | 25% HD20 | — | 9.96 | 720 h | 0/0 | 0/0 | 576 | 2.5 | 51.74 | 12.94 | 0.33 |
| H232 | 20% LS | — | 15% HD20 | — | 11.68 | 720 h | 0/0 | 0/0 | 1080 | 4.3 | 51.74 | 12.94 | 0.33 |
| H235 | — | 5% CS | 15% HD20 | — | 16.90 | 720 h | 0/0.5 | 1/3.5 | 408 | 2.8 | 63.68 | 15.92 | 0.40 |
| H237 | — | 10% CS | 10% HD20 | — | 21.91 | 720 h | 0/1.5 | 0/2.5 | 408 | 3.3 | 63.68 | 15.92 | 0.40 |
| H238 | — | 10% CS | 15% HD20 | — | 17.35 | 720 h | 0/0 | 0/1.5 | 1080 | 2.8 | 59.70 | 14.93 | 0.38 |
| H252 | — | 10% CS | 15% HD20 | 1% CTX | 22.91 | 720 h | 0/0 | 0/0 | 504 | 3.2 | 58.90 | 14.73 | 0.38 |
| H253 | — | 10% CS | 15% HD20 | 2% CTX | 26.21 | 720 h | 0/0 | 0/1 | 1008 | 3.6 | 58.10 | 14.53 | 0.38 |
| H254 | — | 10% CS | 15% HD20 | 3% CTX | 28.30 | 720 h | 0/0 | 0/1 | 840 | 3.4 | 57.30 | 14.33 | 0.38 |
| H239 | — | 10% CS | 25% HD20 | — | 58.36 | 720 h | 0/1 | 0/1.5 | 1080 | 3.4 | 51.74 | 12.94 | 0.33 |
| H240 | — | 20% CS | 10% HD20 | — | 16.09 | 720 h | 0/0 | 0/0 | 1080 | 4.0 | 55.72 | 13.93 | 0.35 |
| H241 | — | 20% CS | 15% HD20 | — | 19.12 | 720 h | 0/1.5 | 0/0.5 | 1080 | 3.9 | 51.74 | 12.94 | 0.33 |
| H242 | — | 20% CS | 25% HD20 | — | 23.39 | 720 h | 0/2.5 | 0/1.5 | 1080 | 5.4 | 43.78 | 10.95 | 0.28 |
| H168 | 5% LS | — | 10% HD15 | 2% CF | 25.8 | 720 h | 0/1 | 0/1 | 480 | 4.2 | 66.06 | 16.52 | 0.43 |
| H169 | 5% LS | — | 10% HD15 | 0.25% PS | 19.5 | 720 h | 1/2 | 0/0 | 984 | 3.4 | 67.46 | 16.87 | 0.43 |
| H170 | 5% LS | — | 10% HD15 | 0.5% PS | 17.7 | 720 h | 0/0 | 0/1 | 1032 | 3.7 | 67.26 | 16.81 | 0.43 |

TABLE 2

| Sample | Flake 1 Lapis Sunlight wt.-% | Flake 2 Crystal Silver wt.-% | Flake 3 Glass flakes wt.-% | Co-monomer 1 cyanoguanidine wt.-% | Rheo. additive 1 CFX wt.-% | Rheo. additive 2 CFX wt.-% | thickness [μm] | H₂S-autoclave test | CC/TT gas. | Fatigue test | EP307 wt.-% | PR722 wt.-% | Co-monomer 2 FL wt.-% |
|---|---|---|---|---|---|---|---|---|---|---|---|---|---|
| G046 | — | — | — | — | — | — | 11.96 | 720 h | 2/4 | | 79.60 | 19.90 | 0.50 |
| G014 | — | — | 10.00 | — | — | — | 23.82 | 720 h | 5/5 | | 71.64 | 19.90 | 0.45 |
| G099 | — | — | — | 10.54 | 2.24 | — | 19 | 720 h | 1/2 | | 69.43 | 17.63 | 0.43 |
| G095 | 5.00 | — | — | 2.93 | 2.31 | — | 29 | 720 h | 0/0 | | 71.45 | 17.86 | 0.45 |
| G096 | 5.00 | — | — | 5.29 | 2.25 | — | 28 | 720 h | 0/0 | | 69.62 | 17.41 | 0.44 |
| G094 | 5.00 | — | — | 10.01 | 2.13 | — | 23 | 720 h | 0/0 | | 65.96 | 16.49 | 0.41 |
| G097 | 5.00 | — | — | 14.73 | 2.01 | — | 24 | 720 h | 0/0 | | 62.29 | 15.57 | 0.39 |
| G098 | 5.00 | — | — | 19.45 | 1.89 | — | 20 | 720 h | 0/1 | | 58.63 | 14.66 | 0.37 |
| G090 | 10.00 | — | — | 2.77 | 2.19 | — | 27 | 720 h | 0/0 | | 67.69 | 16.92 | 0.42 |
| G091 | 10.00 | — | — | 5.01 | 2.13 | — | 22 | 720 h | 0/0 | | 65.96 | 16.49 | 0.41 |
| G089 | 10.00 | — | — | 9.48 | 2.02 | — | 27 | 720 h | 0/0 | ok | 62.49 | 15.62 | 0.39 |
| D092 | 10.00 | — | — | 13.95 | 1.91 | — | 26 | 720 h | 0/0 | | 59.02 | 14.75 | 0.37 |
| G093 | 10.00 | — | — | 18.43 | 1.79 | — | 28 | 720 h | 0/1 | | 55.54 | 13.89 | 0.35 |
| G035 | 20.00 | — | — | — | — | — | 15.67 | 720 h | 0/1 | | 63.68 | 15.92 | 0.45 |
| G049 | 20.00 | — | — | — | 2.00 | — | 24.25 | 720 h | 1/1 | | 62.09 | 15.52 | 0.39 |
| G048 | 20.00 | — | — | — | — | 2.30 | 26.58 | 720 h | 1/1 | | 61.85 | 15.46 | 0.39 |
| G085 | 20.00 | — | — | 2.46 | 1.96 | — | 33 | 720 h | 0/0 | | 60.17 | 15.04 | 0.38 |
| G086 | 20.00 | — | — | 4.45 | 1.89 | — | 34 | 720 h | 0/0 | | 58.63 | 14.66 | 0.37 |
| G051 | 20.00 | — | — | 10.40 | — | — | 23.19 | 720 h | 0/0 | | 55.40 | 13.85 | 0.35 |
| G055 | 20.00 | — | — | 10.16 | 1.75 | — | 29.72 | 720 h | 0/0 | ok | 54.21 | 13.55 | 0.34 |
| G053 | 20.00 | — | — | 10.12 | — | 2.02 | 35.40 | 720 h | 0/0 | | 53.97 | 13.49 | 0.34 |
| G039 | 27.40 | — | — | — | 1.83 | — | 25.66 | 720 h | 0/0 | | 56.33 | 14.08 | 0.35 |

TABLE 2-continued

| Sample | Flake 1 Lapis Sunlight wt.-% | Flake 2 Crystal Silver wt.-% | Flake 3 Glass flakes wt.-% | Co-monomer 1 cyano-guanidine wt.-% | Rheo. additive 1 CFX wt.-% | Rheo. additive 2 CFX wt.-% | thickness [μm] | H₂S-autoclave test | CC/TT gas. | Fatigue test | EP307 wt.-% | PR722 wt.-% | Co-monomer 2 FL wt.-% |
|---|---|---|---|---|---|---|---|---|---|---|---|---|---|
| G037 | 23.99 | — | — | — | — | 2.22 | 29.69 | 720 h | 0/0 | | 58.74 | 14.69 | 0.37 |
| G060 | | 20.00 | | 10.40 | | | 24.42 | 720 h | 0/0 | | 55.40 | 13.85 | 0.35 |
| G064 | | 20.00 | | 10.16 | 1.75 | | 34.49 | 720 h | 0/0 | | 54.21 | 13.55 | 0.34 |
| G062 | | 20.00 | | 10.12 | | 2.02 | 30.73 | 720 h | 0/0 | | 53.97 | 13.49 | 0.34 |

REFERENCES CITED

WO 2004/022806 A1
JP S54-011938 A
WO 2006/079643 A1
US 2009/0277625 A1
JP S62-050368 A
DE 10 2006 062 500 A1
WO 2005/044551 A1
DE 10 2009 037 323 A1
DE 102 009 031 266 A1
DE 603 19 674 T2
WO 2006/007385 A1
EP 1 718 690 A1
EP 0 387 692 A2
DE 42 12 633 A1
WO 93/21127 A1
WO 96/31572 A1
U.S. Pat. No. 3,705,109
RU 2083621
G. Buxbaum and G. Pfaff Industrial inorganic pigments, 3$^{rd}$ ed. Wiley-VCH pages 243-248
F. J. Maile et al. Progress in Organic Coating 2005, 54, 150-163

The invention claimed is:

1. Coating composition, comprising:
 a mixture of:
 a) 50 to 98 wt. % of a binder comprising at least one cross-linkable resin, wherein the resin is selected from the group consisting of epoxy resin, phenol resin, phenoxy resin and mixtures thereof, and wherein the resin comprises at least one polar group selected from the group consisting of hydroxyl, alkoxysilyl, epoxy, carboxyl, ester, carbonyl, oxycarbonyl, sulfide, disulfide, sulfonyl, sulfinyl, thiol, thiocarbonyl, imino, amino, nitrile, ammonium, imide, amide, hydrazo, azo, diazo, cyanide, guanidine, oxygen-containing heterocyclic, nitrogen-containing heterocyclic and sulfur-containing heterocyclic groups;
 b) 2 to 25 wt. % of a plurality of at least one type of hydrophilic flake with an aspect ratio of more than 10, said flakes comprising a glass, silicon dioxide, or alumina substrate coated with a transition metal oxide layer of $TiO_2$, $Fe_2O_3$, $V_2O_5$, $CeO_2$, $MnO_2$, CuO, $ZrO_2$, or mixtures thereof;
 c) 0.1 to 2 wt. % of a perfluoropolyether; and
 d) an organic solvent,
 wherein the binder is dissolved in the organic solvent, and a ratio of the organic solvent to the binder is 2:1 to 1:5.

2. Coating composition according to claim 1, further comprising inorganic particles selected from the group consisting of oxides, nitrides, carbides, carbonitrides, silicides, borides and mixtures thereof.

3. Coating composition according to claim 2, wherein the inorganic particles are selected from the group consisting of at least one of boron carbide, silicon carbide silicon nitride, and mixtures thereof.

4. Coating composition according to claim 1, wherein the coating composition further comprises a rheology additive selected from the group consisting of synthetic waxes, polyethylene waxes, polytetrafluoroethylene waxes, high-density polyethylene waxes, polypropylene waxes, ethylene copolymers, ethylene acrylic acid copolymers and ethylene vinyl acetate copolymers.

5. Coating composition according to claim 1, wherein the binder comprises a mixture of epoxy resins and phenoxy resins.

6. Coating composition according to claim 5, wherein a ratio of epoxy resins and phenoxy resins is between 10:1 to 1:1.

7. Coating composition according to claim 1, wherein the polar group is selected from the group consisting of alkoxysilyl, carboxyl, sulfide, disulfide, sulfonyl, sulfinyl, thiol, cyanide, and nitrogen-containing heterocyclic groups.

8. Coating composition according to claim 1, wherein the organic solvent is selected from the group consisting of halogenated hydrocarbons, ethers, ketones, alcohols, (cyclo) aliphatic or aromatic solvents in a boiling range from about 150° C. to 180° C., esters, and a mixture thereof.

9. Coating composition according to claim 1, wherein the flakes have an average diameter between 1 and 500 μm and an average thickness between 0.1 of 5 μm.

10. Coating composition according to claim 1, wherein the flakes have an average diameter in a range of 1-15 μm and an average thickness of between 0.1 of 1 μm.

11. Coating composition according to claim 1, wherein the transition metal oxide layer has a closed grain structure.

12. Coating composition according to claim 1, wherein the binder is an epoxide compound comprising a polyglycidyl ether of a dihydric phenol.

13. A coated substrate, comprising a glass, ceramic, or plastic substrate coated with the coating composition according to claim 1.

14. A coated substrate comprising a substrate comprising a semiconductor, wherein the semiconductor is coated with the coating composition according to claim 1.

15. A composition, comprising:
 a cured coating for a gaseous corrosive environment comprising:
 50 to 96 wt. % of a binder comprises a mixture of epoxy resin and phenoxy resin;
 5 to 27.4 wt. % of at least one type of hydrophilic flakes comprising a silicon dioxide or alumina substrate with an aspect ratio of more than 10 coated with $TiO_2$; and
 2 to 20 wt. % cyanoguanidine crosslinking comonomer
 1 to 3 wt. % ethylene vinyl acetate copolymer; and
 0.28 to 0.5 wt. % perfluoropolyether.

16. Coating composition according to claim 15, wherein the at least one type of hydrophilic flakes has a tile-like arrangement configured to elongate a diffusion path of gas molecules.

17. A composition, comprising:
  a cured coating composition for a liquid corrosive environment comprising:
  50 to 93 wt. % of a binder comprising a mixture of epoxy resin and phenoxy resin;
  5 to 20 wt. % of at least one type of hydrophilic flake comprising a silicon dioxide or alumina substrate with an aspect ratio of more than 10 coated with $TiO_2$; and
  10 to 25 wt. % boron carbide particles;
  0.28 to 0.5 wt. % perfluoropolyether.

* * * * *